(12) United States Patent
Hirashima et al.

(10) Patent No.: US 6,715,128 B1
(45) Date of Patent: Mar. 30, 2004

(54) METHOD FOR CONVERTING DIRECTORY DATA, AND PROGRAM AND DEVICE THEREFOR

(75) Inventors: Yoko Hirashima, Yokohama (JP); Satoshi Kikuchi, Yokohama (JP); Kenta Shiga, Yokohama (JP); Hitoshi Yui, Yokohama (JP); Masakazu Mitsuhashi, Ebina (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 0 days.

(21) Appl. No.: 09/448,474

(22) Filed: Nov. 24, 1999

(30) Foreign Application Priority Data

Nov. 27, 1998 (JP) .......................... 10-337478

(51) Int. Cl.[7] .............................. G06F 17/30
(52) U.S. Cl. ...................... 715/511; 707/203
(58) Field of Search ............ 715/511; 707/201, 707/203, 204; 709/246

(56) References Cited

U.S. PATENT DOCUMENTS

| | | | | |
|---|---|---|---|---|
| 5,684,990 A | * | 11/1997 | Boothby ................. | 707/203 |
| 5,765,171 A | * | 6/1998 | Gehani et al. ........... | 707/203 |
| 5,928,329 A | * | 7/1999 | Clark et al. ............. | 709/227 |
| 5,943,675 A | * | 8/1999 | Keith et al. ............. | 707/201 |
| 5,943,676 A | * | 8/1999 | Boothby ................. | 707/201 |
| 5,950,198 A | * | 9/1999 | Falls et al. .............. | 707/8 |
| 5,970,501 A | * | 10/1999 | Hunkins et al. ........... | 707/200 |
| 6,145,012 A | * | 11/2000 | Small ...................... | 709/246 |
| 6,212,529 B1 | * | 4/2001 | Boothby et al. .......... | 707/201 |
| 6,223,187 B1 | * | 4/2001 | Boothby et al. .......... | 707/201 |
| 6,301,589 B1 | * | 10/2001 | Hirashima et al. ........ | 707/204 |

FOREIGN PATENT DOCUMENTS

| | | |
|---|---|---|
| JP | 6-139126 | 5/1994 |
| JP | 10-49408 | 2/1998 |

OTHER PUBLICATIONS

S. Balasubramaniam et al., "What is a File Synchronizer?", Proceedings of the 4th Annual ACM/IEEE International Conference on Mobile Computing and Networking (ACM: 1998), pp. 98–108.*

Chapura, Inc., PilotMirror Features page, pp. 1–3 (1997), downloaded on Apr. 26, 2003 from http://web.archive.org/web/19970714083856/www.chapura.com/features.html.*

Chapura, Inc., Complete Competitive Comparison of Outlook™ 97 Synchronization Products, pp. 1–2 (1997), downloaded on Apr. 26, 2003 from http://web.archive.org/web/19970714084019/www.chapura.com/3compare.html.*

Jan Trumbo et al., "Directory Sync Revisited: You Get What You Pay For," Network Computing (Feb. 13, 1996), downloaded on Apr. 26, 2003 from http://www.opus1.com/www/jms/nc–dirsync2.html.*

DATAMATION, May 1, 1996, "Dueling Directories".

* cited by examiner

*Primary Examiner*—Sanjiv Shah
(74) *Attorney, Agent, or Firm*—Mattingly, Stanger & Malur, P.C.

(57) ABSTRACT

A method for converting directory data is executed to selectively reflect any entry of the directory data onto application data. The directory data converting method includes the steps of searching from the directory data the data of the directory entry specified by a filtering rule corresponding to the application data; converting the searched directory entry data according to the schema conversion rule compatible with the filtering rule used for searching the data; and reflecting the schema-converted entry data onto said application data.

20 Claims, 17 Drawing Sheets

| CHANGE OPERATION TYPE | |
|---|---|
| ENTRY ADDITION (ADD) | |
| ENTRY ADDITION (DEL) | |
| ENTRY ATTRIBUTE CHANGE (MOD) | ADDITION OF ATTRIBUTE VALUE |
| | DELETION OF ATTRIBUTE VALUE |
| | REPLACEMENT OF ATTRIBUTE VALUE |
| DN CHANGE (RENAME) | |

CHANGE HISTORY

TARGET ENTRY ATTRIBUTE

CHANGE CONTENT DETAIL (ATTRIBUTE CHANGE, DN CHANGE)

CHANGE CONTENT DETAIL (ENTRY ADDITION)

FIG.9
CHANGE HISTORY
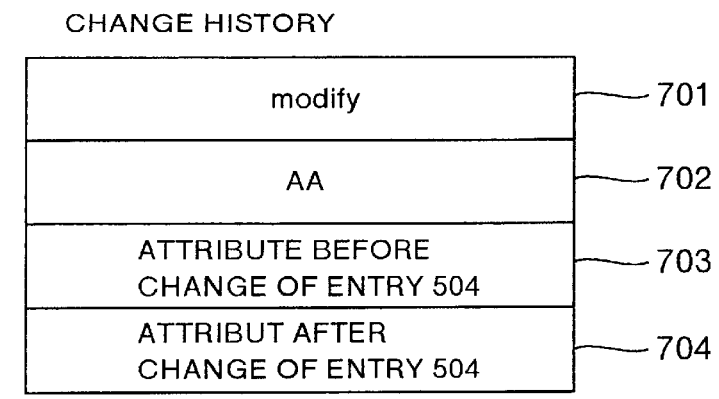
FIG.10
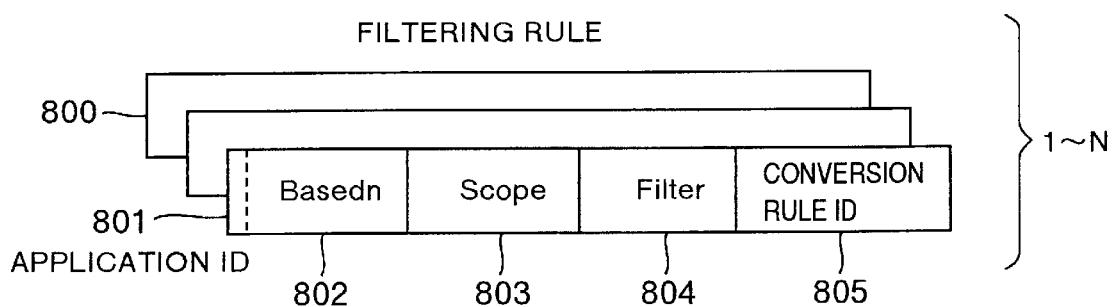
FIG.11
| # | ITEM | DESCRIPTION |
|---|------|-------------|
| 1 | base | ONLY FOR BASE POINT ENTRY |
| 2 | onelevel | FOR CHILD ENTRY OF BASE POINT |
| 3 | subtree | FOR ALL ENTRIES AFTER BASE POINT |

FILTERING RULE

FIG.14A

| ATTRIBUTE NAME | ATTRIBUTE NAME GENERATION RULE |
|---|---|
| NAME | SURNAME + FORENAME |
| MAIL ADDRESS | USER ID +@dir.hitachi.co.jp |
| EXTENSION PHONE NUMBER | EXTENSION PHONE NUMBER |

912 / 922 / 902

FIG.14B  SCHEMA A

| ATTRIBUTE NAME | ATTRIBUTE VALUE |
|---|---|
| SURNAME | Hirashima |
| FORENAME | Youko |
| EXTENSION PHONE NUMBER | 012-3456 |
| USER ID | Hira |

⇩ DONVERSION

FIG.14C  SCHEMA B

| ATTRIBUTE NAME | ATTRIBUTE VALUE |
|---|---|
| NAME | Hirashima Youko |
| MAIL ADDRESS | Hira@dir.hitachi.co.jp |
| EXTENSION PHONE NUMBER | 012-3456 |

FIG.15
SCHEMA CONVERSION RULE

| DesignUser | — 901 |
|---|---|
| ATTRIBUTE CONVERSION RULE | — 902 |

ENTRY INFORMATION TO BE ADDED

ENTRY INFORMATION TO BE DELETED

FIG.24
ENTRY INFORMATION BEFORE CHANGE OF ATTRIBUTE
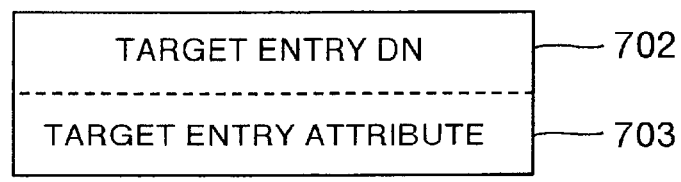
FIG.25
ENTRY INFORMATION AFTER CHANGE OF ATTRIBUTE
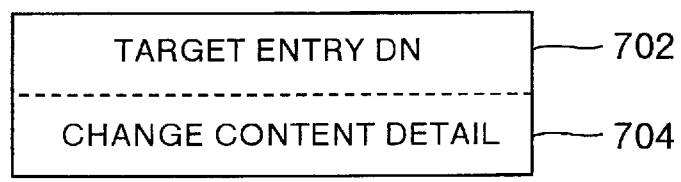
FIG.26
CHANGE HISTORY ①
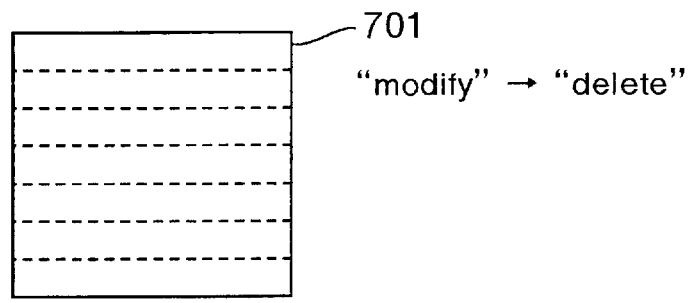
"modify" → "delete"
CHANGE HISTORY ②
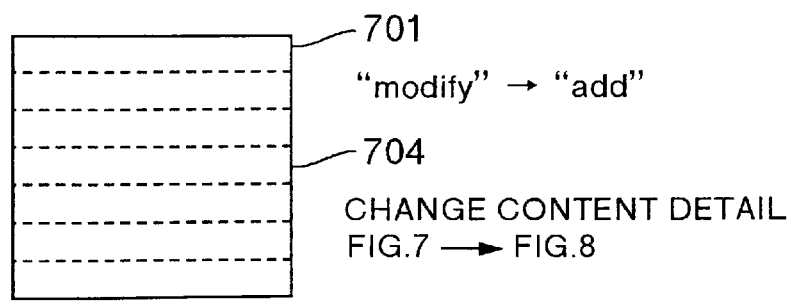
"modify" → "add"
CHANGE CONTENT DETAIL
FIG.7 → FIG.8

FIG.28
ENTRY INFORMATION BEFORE CHANGE OF DN
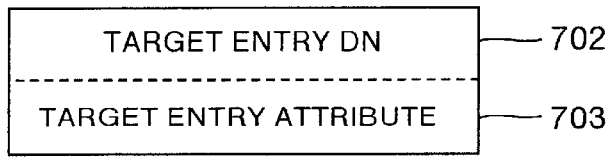
FIG.29
ENTRY INFORMATION AFTER CHANGE OF DN
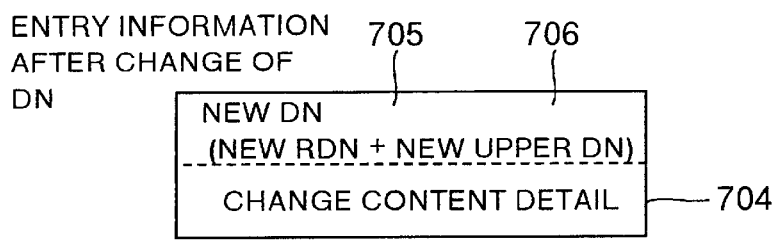
FIG.30
CHANGE HISTORY ③
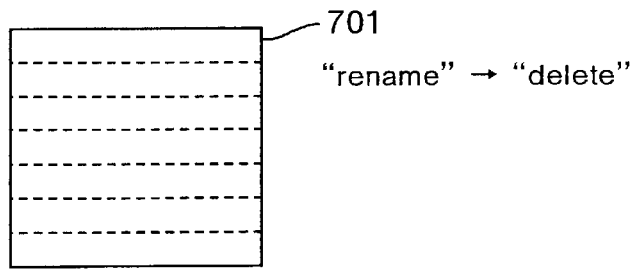
701 "rename" → "delete"
CHANGE HISTORY ④
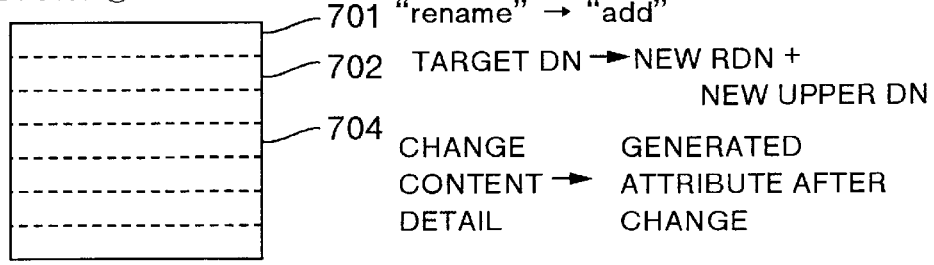
701 "rename" → "add"
702 TARGET DN → NEW RDN + NEW UPPER DN
704 CHANGE CONTENT DETAIL → GENERATED ATTRIBUTE AFTER CHANGE

METHOD FOR CONVERTING DIRECTORY DATA, AND PROGRAM AND DEVICE THEREFOR

BACKGROUND OF THE INVENTION

The present invention relates to a directory service which enables to manage business information in a centralized manner, and more particularly to a technology of converting directory data arranged so that a content of the data directory service may be reflected on different data schemata inside of an application provided with its own database.

The publication of "Dueling Directories", DATAMATION, May 1, 1996, pages 48 to 50 and the specifications of JP-A-10-49408 and JP-A-6-139126 disclose directory data and data schemata.

Today, the normal in-house information system includes plural individual systems such as network operating systems and mailing systems mingled therein. Under this type of office automation circumstances, each user is required to enter his or her user information proper to each system such as a log-in name, a password, and a mail address, for the purpose of using each system included in the in-house information system. Hence, a system administrator is required to do a burdensome operation of registering and deleting the user information proper to each system each time a user is added or exists.

Moreover, in general, the in-house information system may be often built at each relatively small-scaled department or section. However, if the in-house information system is independent in each section or department, the procedure on moving persons from one section to another and the exchange of mails between sections cannot be smoothly exchanged. In order to overcome this disadvantage, it has been expected to build a large-scaled in-house information system integrated all over an company.

Under these circumstances, as a service that enables to manage user information and information on instruments and resources used in different systems in a centralized manner or an infrastructure of an overall in-house information system, remark is focused on a so-called directory service.

The representative standards for the directory service refer to X.500 recommended by CCITT. X.500 defines the directory service as a client-server type distributed system architecture and defines the DAP (Directory Access Protocol) as a directory access protocol between a client and a server.

The X.500-compliant directory service includes a data model in which hierarchical management is done in a tree-structure or a directory-tree manner. A directory entry is located in a leaf. Each entry has a RDN (relative distinguished name) to be uniquely distinguished among entries having the same parent entry. Further, each entry is uniquely distinguished by a DN (Distinguished Name) having a train of RDNs for indicating a passage from a root of a tree structure. In addition, each entry may include as attributes various kinds of information such as a mail address, a name, a phone number, a fax number, and a photo of each user.

Further, each entry inevitably belongs to one or more object classes. Herein, the object class defines a set of essential attributes to the class or attributes to be possibly incorporated. The combination of this object class definition and the tree structure definition is called a directory schema or simply schema.

The IEFT (Internet Engineering Task Force), which is a standardizing body about an internet, defines the LDAP (Light Weight Directory Access Protocol) (RFC2251) operating on a TCP/IP task. It is advantageous that the LDAP is more light than the DAP operating on an OSI task.

As mentioned above, though remark is focused on the centralized management of business information through the effect of a directory service for reducing the burden on the management, in actual, almost of the applications (in-house information systems) installed at each section or department of a company include their own databases and serve to manage the business information about users and the company in the proper formats to the applications. (Hereafter, the business informations managed by these applications are referred to as application data.) It means that one house (company) includes a database managed on the directory service and plural databases having their own schemata. Hence, each house needs the same number of units of management information as the number of applications multiplied by the number of clients, which results in making the centralized management difficult.

For solving these problems, the following two method have been proposed.

The first method is configured to manage all the data required by every application through the directory service so that each application may support a directory access protocol and refer to directory data.

Like the first method, the second method is also configured to manage all the data required by every application through the directory service. However, the second method is configured to convert the proper data to the application and then reflect the data onto the proper database to the application. The application refers to its own database as usual.

According to the first method, there may exist one or some applications that cannot refer to the directory data, because one or some of the applications included in the in-house system cannot realistically support the directory access protocol in light of the problems on the structure and the development of the program. Further, this method is configured to directly refer to the directory data. Hence, the application can be executed only when the directory service is running.

On the other hand, the second method does not have the problem described with respect to the first method and enables to manage the business information in a centralized manner.

Many proposals have been made on the second method, that is, the method in which the directory data is reflected on another unit of directory data or a proper database to a specific application and thereby synchronization is taken between the directory data or the directory data and the proper database to the specific application.

However, the conventional method according to the second method, in which synchronization is taken between the directory data or between the directory data and the proper database to the specific application, includes only one conversion rule for one object class. Disadvantageously, it means that all the entries belonging to the class are converted on the conversion rule. Hence, part of the directory tree cannot be selectively reflected on another database. As another disadvantage, only the same schema conversion holds true to the entries of the same class existing in the same directory.

In actual, however, as mentioned above, almost of the applications (in-house information systems) respectively installed in the sections and departments of the company include their own databases. Normally, the different databases have their own schemata for making the target object and object abstract. Hence, some demands take place. For example, only the information about any business office is searched from the directory data for managing the overall information of the company and then is reflected on the information of the application to be operated at each business office. Or, when the schema conversion is done from the user information managed by the directory into the user information of the application, the schema on the corresponding application to the post of the user is changed. The conventional method for taking synchronization between the directory data or between the directory data and the proper database to the specific application cannot cope with those demands.

SUMMARY OF THE INVENTION

It is an object of the present invention to provide a method, a device, and a program for converting directory data which are arranged to reflect a content of directory data on a proper database to each application even if the proper database to each application has its own target object or schema for searching the target object.

According to an aspect of the invention, a method for converting directory data, for reflecting a content of the directory data onto at least one unit of application data, comprises the steps of:

searching data of a directory entry specified by at least one filtering rule related with the application data on which the content of the directory data is to be reflected;

schema-converting the data of the searched directory entry on the basis of the schema conversion rule for converting the data based on the schema of the directory data into the data based on the schema of the application data, the schema conversion rule being compatible with the filtering rule used for searching the data; and reflecting the data of the schema-converted entry onto the application data on which the content of the directory data is to be reflected.

In the method of the invention, if the content of the directory data is reflected onto the application data, at first, the data of the target directory entry of the application is searched by the filtering rule compatible with the application. Then, the searched data of the directory entry is schema-converted on the schema conversion rule compatible with the filtering rule used by searching the data and then is reflected on the application data.

According to the invention, hence, if the directory entry or schema is individual in each application, the content of the directory data may be reflected onto the data of each application.

Further, for example, by allocating two or more filtering rules to one application and different schema conversion rules to the filtering rules respectively, the content of the directory data to be reflected on the application data may be schema-converted in each data unit of the directory entry to be searched by each of those filtering rules.

BRIEF DESCRIPTION OF THE DRAWINGS

FIG. 9 is a view showing a change history created in adding an attribute of an entry 504 for representing an employee A;

FIG. 10 is a view showing a content of a filtering rule recorded in a filtering rule table 32;

FIG. 11 is a table showing possible values and their meanings to be taken by SCOPE 803 shown in FIG. 10;

FIG. 12 is a view showing an example of a filtering rule on which the change to be done for an entry 504 for representing the employee A is reflected onto the application data of an application server 2a;

FIGS. 14A to 14C are tables showing the attribute conversion rule 902 shown in FIG. 13;

FIG. 15 is a view showing an example of a schema conversion rule on which the change to be done for the entry 504 for representing the employee A is to be reflected onto the application data of the application server 2a;

FIG. 24 is a view showing entry information before changing an attribute to be created in the flowchart shown in FIG. 23;

FIG. 25 is a view showing entry information after changing an attribute to be created in the flowchart shown in FIG. 23;

FIG. 26 is an explanatory view showing a process of dividing a change history at a step S1510 shown in FIG. 23;

FIG. 28 is a view showing entry information before changing a DN to be created in the flowchart shown in FIG. 27;

FIG. 29 is a view showing entry information after changing a DN to be created in the flowchart shown in FIG. 27;

FIG. 30 is an explanatory view showing a process of dividing a change history at a step S1610 shown in FIG. 27.

DETAILED DESCRIPTION OF THE EMBODIMENTS

Hereafter, the description will be oriented to an embodiment of the present invention.

Figure 1:
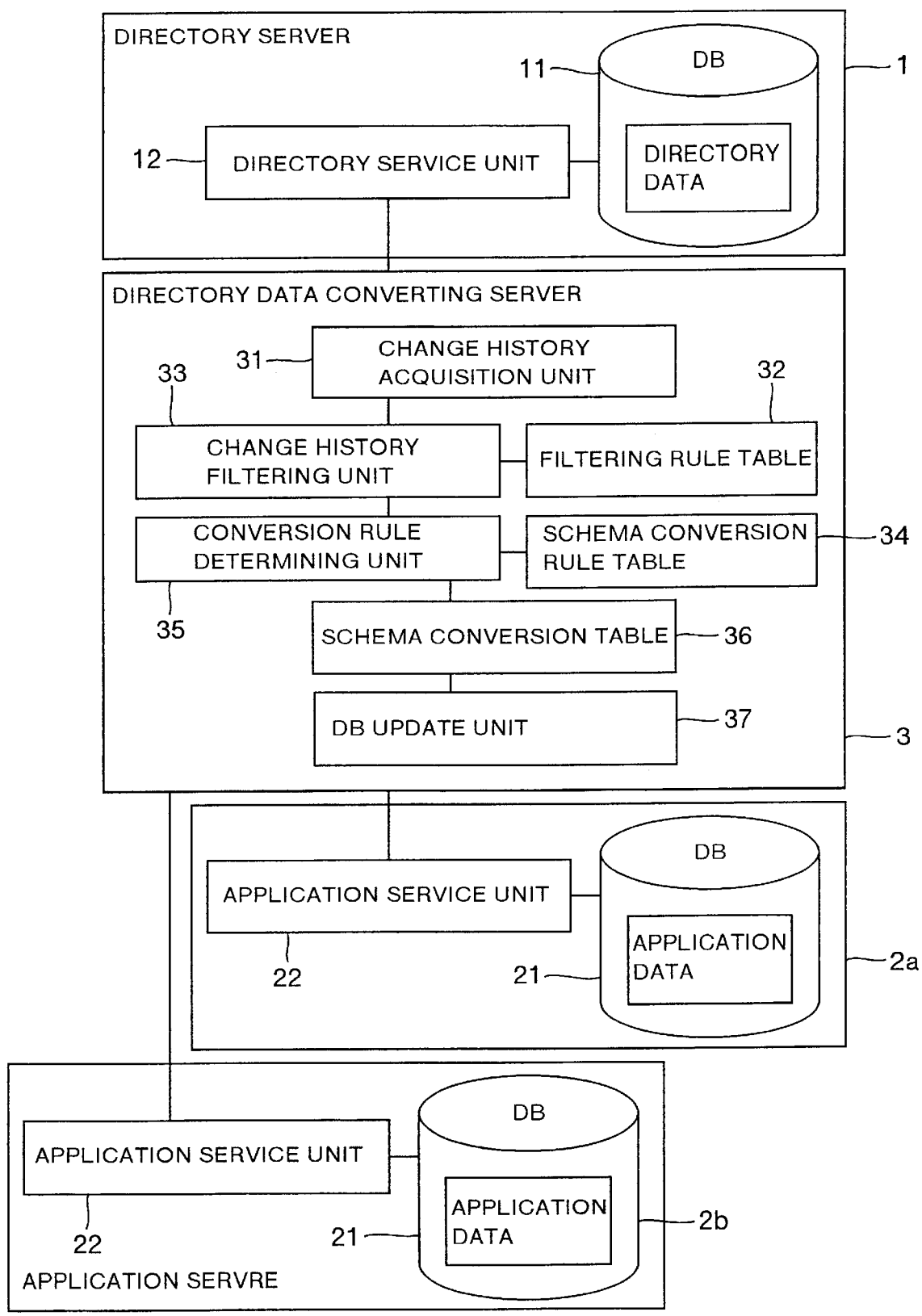
FIG. 1 is a functional block diagram showing a directory service system to which one embodiment of the present invention is applied.

FIG. 1 is a functional block diagram showing a directory system to which the embodiment of the invention is to be applied.

A numeral 1 denotes a directory server for executing a directory service to be built as a basis of an overall in-house information system, which includes a database (DB) 11 for directory data for holding the directory data and a directory service unit 12 for managing business information over the company in a centralized manner according to the directory data stored in the database (DB) for directory data 11.

Numerals 2a and 2b denote application servers for executing application services built as an in-house information system at each business office, section, or department, each of which includes a database (DB) for application data 21 for saving application data and an application service unit 22 for managing in-house information in a centralized manner at each business office, section, or department to be processed by the application according to the application data stored in the database (DB) 21.

In FIG. 1, two application servers are illustrated. It goes without saying that the number of the application serves is not limited to two.

A numeral 3 denotes a directory data converting server which has a function of reflecting the content of the directory data stored in the directory server onto the application data stored in the application servers 2a and 2b, respectively. The directory data converting server 3 includes a change history acquisition unit 31, a filtering rule table 32, a change history filtering unit 33, a schema conversion rule table 34, a conversion rule determining unit 35, a schema converting unit 36, and a database (DB) update unit.

The change history acquisition unit 31 serves to acquire the history of the change of the directory data executed by the directory service unit 12. The filtering rule table 32 stores at least one of the filtering rules for searching data of a given directory entry compatible with each or both of the application data stored in the application servers 2a and 2b. The change history filtering unit 33 serves to search the history of the change of a given directory entry from the change history acquired by the change history acquisition unit 31. The schema conversion rule table 34 stores the schema conversion rule for converting the schema of the directory data into that of the application data. The conversion rule determining unit 35 serves to determine the schema conversion rule used for converting the schema of the data of the directory entries contained in the change history searched according to the filtering rule used by the change history filtering unit 33 for searching the change history. The schema converting unit 36 serves to convert the schema of the data of the directory entries contained in the change history searched by the change history filtering unit 33 according to the schema conversion rule determined by the conversion rule determining unit 35. The DB update unit 37 serves to reflect or change the data of the directory entry schema-converted by the schema converting unit 36 into the application data corresponding to the filtering rule used by the change history filtering unit 33 for searching the change history containing the data of the directory entry according to the type of the change operation indicated in the change history.

In turn, the description will be oriented to the hardware arrangement for realizing the aforementioned directory service system.

Figure 2:
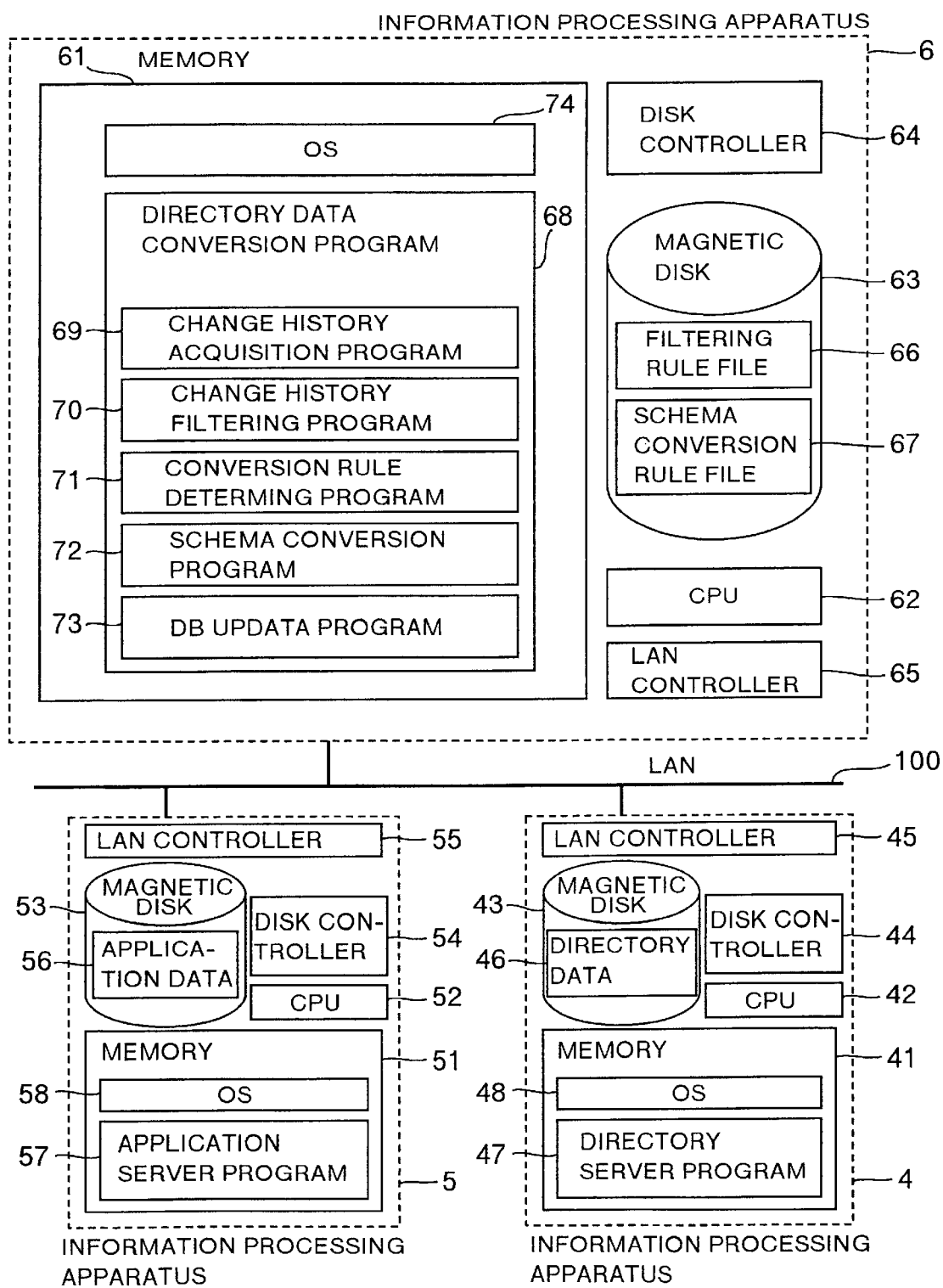
FIG. 2 is a block diagram showing one example of hardware arrangement for realizing the directory service system shown in FIG. 1.

FIG. 2 shows an example of a hardware arrangement for realizing the directory service system shown in FIG. 1.

In FIG. 2, an information processing apparatus 4 is served as the directory server 1. The apparatus 4 includes a memory 41, a CPU 42, a magnetic disk 43, a disk controller 44 for controlling access to the magnetic disk 43, and a LAN controller 45 for communicating with another information processing apparatus through a LAN 100.

The magnetic disk 43 stores an operating system (OS) 48 and a directory server program 47. The CPU 42 takes the operating steps of loading the OS 48 stored on the magnetic disk 43 onto a memory 41 by the disk controller 44, executing the OS 48, loading an application server program 47 stored on the magnetic disk 43 onto the memory 41 by the disk controller 44, and execute the program 47. These operations correspond to the process of the directory service unit 12 shown in FIG. 1. The directory data 46 is stored on the magnetic disk 43. Hence, the magnetic disk 43 is served as the directory data DB 11 shown in FIG. 1.

The information processing apparatus 5 is served as the application server 2. The information processing apparatus 5 includes a memory 51, a CPU 52, a magnetic disk 53, a disk controller 54 for controlling access onto the magnetic disk 53, and a LAN controller 55 for communicating with another information processing apparatus through the LAN 100.

The magnetic disk 53 stores the operating system (OS) 58 and the application server program 57. The CPU 52 takes the operating steps of loading the OS 58 stored on the magnetic disk 53 onto the memory 51 by the disk controller 54, executing the OS 58, loading the application server program 57 stored on the magnetic disk 53 onto the memory 51 by the disk controller 54, and executing the program 57. These operations correspond to the process of the application service unit 22 shown in FIG. 1. Further, the magnetic disk 53 stores the application data 56. Hence, the magnetic disk 53 is served as the application data DB 21 shown in FIG. 1.

The information processing apparatus 6 is served as the directory data converting server. The apparatus 6 includes a memory 61, a CPU 62, a magnetic disk 63, a disk controller 64 for controlling access onto the magnetic disk 63, and a LAN controller 65 for communicating with another information processing apparatus through the LAN 100.

The magnetic disk 63 stores an operating system (OS) 74, a directory data conversion program 68, and so forth. The directory data conversion program 68 is composed of a change history acquisition program 69, a change history filtering program 70, a conversion rule determining program 71, a schema conversion program 72, and a DB update program 73. The CPU 62 takes the operating steps of loading the OS 74 stored on the magnetic disk 63 onto the memory 61 by the disk controller 64, executing the OS 74, and then executing the change history acquisition program 69 stored on the magnetic disk 63, the change history filtering program 70, the conversion rule determining program 71, the schema conversion program 72, and a DB update program 73. These second-half operations correspond to the processes of the change history acquisition unit 31, the change history filtering unit 33, the conversion rule determining unit 35, the schema converting unit 36, and the DB update unit 37 shown in FIG. 1, respectively. Further, the magnetic disk 63 stores a filtering rule file 66 and a schema conversion file 67. Hence, the magnetic disk 53 is served as the filtering rule table 32 and the schema conversion rule table 34 shown in FIG. 1.

In turn, the description will be oriented to the general operation of the directory service system arranged as described above.

Figures 3, 4:
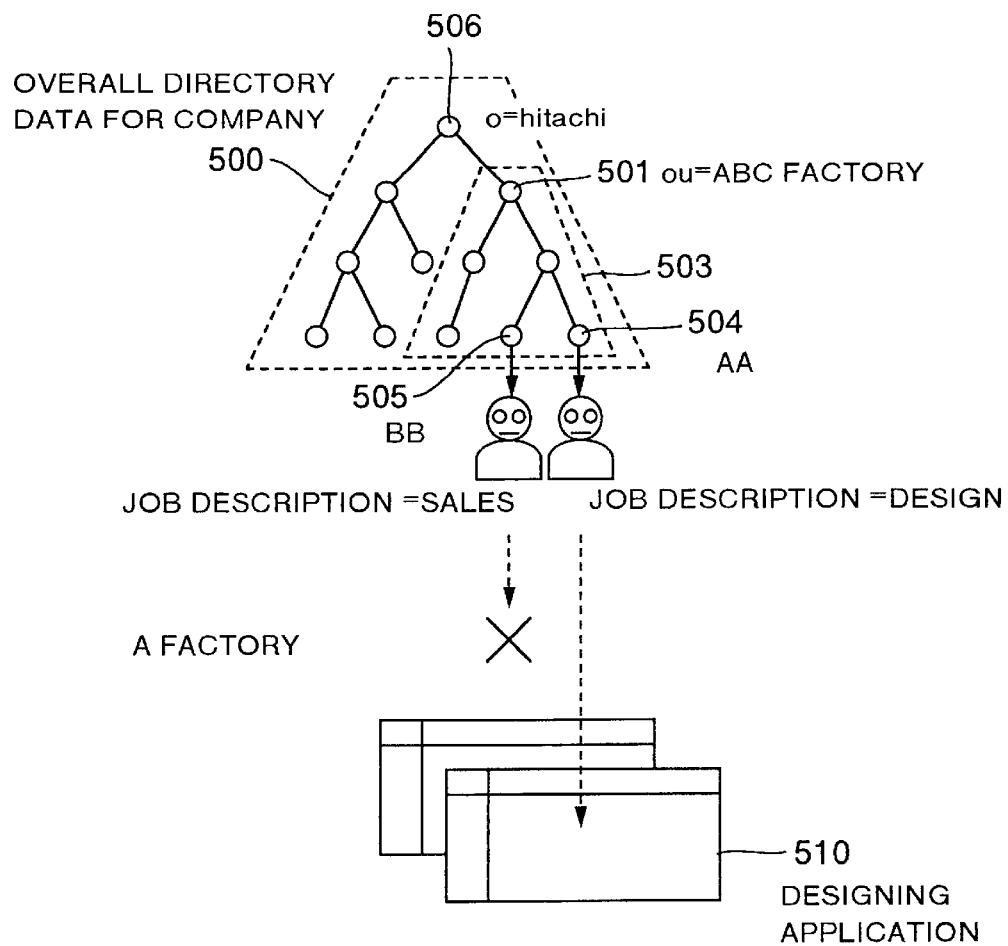
FIG. 3 is an explanatory view roughly showing an operation of the directory service system shown in FIG. 1.
FIG. 4 is a table showing a list of change operations done by a directory service 12 against directory data.

FIG. 3 is an explanatory view for showing the general operation of the directory service system shown in FIG. 1.

In FIG. 3, a numeral 500 denotes the directory data all over a company. Concretely, the directory data 500 corresponds to the data of all the employees, that is, the directory data stored in the directory data DB 11. As stated above, the directory data is hierarchically managed as a tree-structure or a directory-tree structure. The branches and the leaves of the tree have the directory entries, respectively. Each entry includes a RDN (Relative Distinguished Name) to be uniquely distinguished among the entries connected to the same parent entry. The entry is uniquely distinguished by a DN (Distinguished Name) corresponding to a sequence of RDNs for indicating a passage from a tree-structure root.

Referring to the example shown in FIG. 3, the directory data 500 all over a company includes entries hierarchically managed in a tree-structure manner with an entry 506 for representing the company HITACHI as abase point. A numeral 501 denotes an entry for representing the ABC factory. A numeral 503 denotes the directory data of the ABC factory. The directory data 503 includes entries hierarchically managed in a tree-structure manner with the entry 501 as a base point. Each of the entries located on the lowest layer of the directory data 500 represents an employee for working for the company HITACHI. Each entry has an attribute for indicating a job description of each employee. In FIG. 3, the entry 504 represents an employee AA having an attribute for indicating his job is a design. The entry 505 represents an employee BB.

In FIG. 3, assume the change of the attributes of the entries 504 and 505. In FIG. 1, the application server 2a serves to manage information of a design department of the ABC factory. The application 2b manages the information of the sales department of the ABC factory. In this case, it is necessary to reflect the data of the entry 504 onto the application data stored in the application server 2a and the data of the entry 505 onto the application data stored in the application server 2b.

In this embodiment, the change history filtering unit 33 operates to search the data of the entry 504 from the change history acquired by the change history acquisition unit 31 from the directory server 1 according to the filtering rule for searching the data of the entry onto which the application data stored in the application server 2a is to be reflected. Next, the schema converting unit 36 operates to convert the schema of the data searched from the entry 504 according to the schema conversion rule compatible with the filtering rule determined by the conversion rule determining unit 35. Next, the entry 505 whose schema is converted is reflected on the application data (corresponding to the designing application 510 in FIG. 3) stored in the application server 2b by the DB update unit 37.

Further, likewise, the change history filtering unit 33 operates to search the data of the entry 505 from the change history acquired from the directory server 1 by the change history acquisition unit 31 according to the filtering rule for searching the data of the entry to be reflected onto the application data provided in the application server 2b. Next, the schema converting unit 36 operates to schema-convert the searched data of the entry 505 according to the schema conversion rule compatible with the filtering rule determined by the conversion rule determining unit 35. Then, the DB update unit 37 operates to reflect the schema-converted data of the entry 505 onto the application data provided in the application server 2b.

In the foregoing operation, the changed data of the entry 504 is reflected only on the application data stored in the application server 2a but not on the application data stored in the application server 2b. The data of the entry 505 is reflected only on the application data provided in the application server 2b but not on the application data stored in the application server 2a.

The filtering rule and the schema conversion rule are created by the administrator of the directory service. These rules are pre-stored in the filtering rule table 32 and the schema conversion rule table 34 contained in the directory data converting server.

In turn, the description will be oriented to the content of the change done by the directory service unit 12 against the directory data DB 11 in the directory server 11.

FIG. 4 shows a list of change operations done by the directory service unit 12 against the directory data.

As shown in FIG. 4, the change operations done by the directory service unit 12 against the directory data include addition and deletion of a directory entry, change of an entry attribute, and change of a DN. The attribute change of the directory entry is further grouped into addition, deletion, and replacement of an attribute value. The directory service unit 12 operates to record the change content as a change history in the directory data DB 11 each time the service unit 12 changes the directory data.

Figure 5:
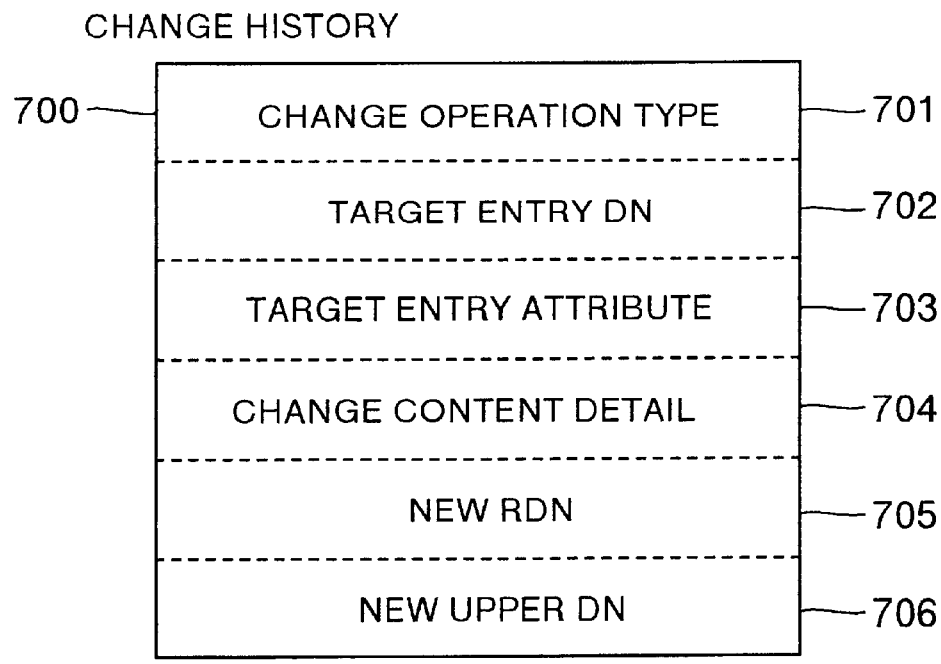
FIG. 5 is a view showing a content of a change history created each time the directory service 12 operates to change the directory data and recorded in a directory data DB11.

FIG. 5 shows the content of the change history created each time the directory service unit 12 changes the directory data and recorded in the directory database DB 11.

As shown in FIG. 5, the change history 700 is made up of a change operation type 701, a target entry DN 702, a target entry attribute 703, a change content detail 704, a new RDN 705, and a new upper DN 706.

The change operation type 701 stores the data for indicating a type of change operation done by the directory service unit 12 against the directory data. Concretely, the following character strings are stored as the data in the type 701. That is, "add" means "addition of an entry", "delete" means "deletion of an entry", "modify" means "change of an entry attribute value", and "rename" means "change of a DN".

The target entry DN 702 stores a character string for representing a DN of a target entry (to be changed) indicated by the change operation type 71, the change operation done by the directory service unit 12 against the directory data.

The target entry attribute 703 stores the attribute before the change operation included in the target entry indicated by the target entry DN 702.

Figure 6:
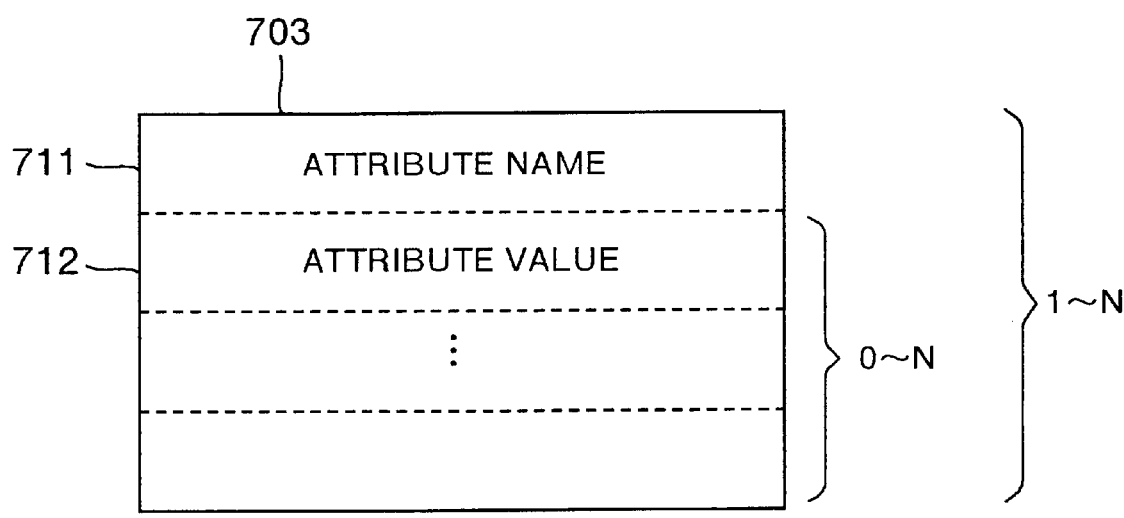
FIG. 6 is a view showing a content stored in a target entry attribute 703 shown in FIG. 5.

FIG. 6 shows the content stored in the target entry attribute 702.

As shown in FIG. 6, the target entry attribute 703 is arranged so that a combination of an attribute name 711 and 0 to N attribute values is provided in each attribute of the target entry indicated by the target entry DN 702. The attribute name 711 stores the data for indicating the attribute name to be changed. The attribute value 712 stores the data for indicating the attribute value before changing the attribute specified by the attribute name 711.

Turning back to FIG. 5, the description will be expanded as follows.

The change content detail 704 stores a concrete value of the changed attribute. The change content detail 704 is provided only if the change operation is "addition of an entry", "change of an entry attribute" or "change of a DN".

Figure 7:
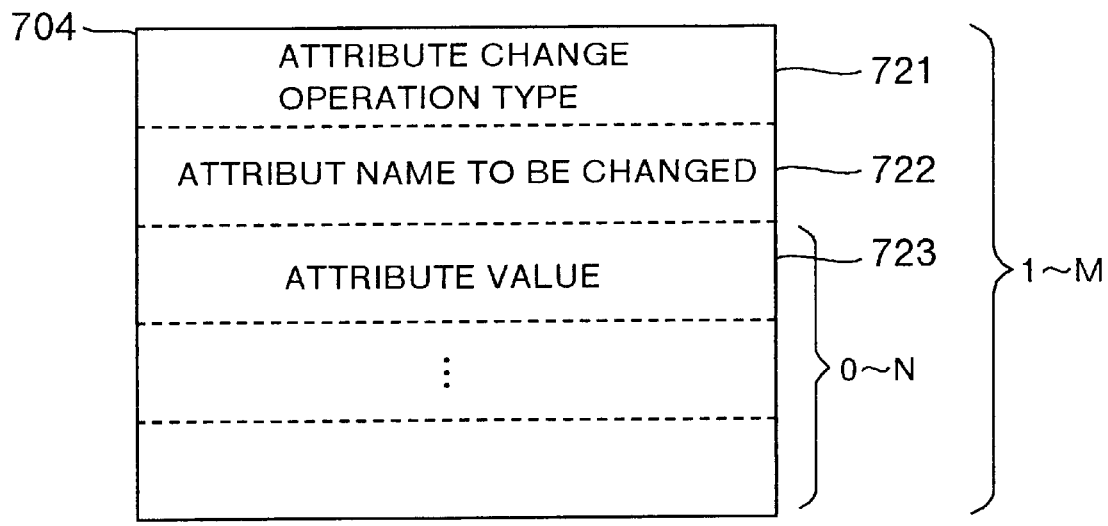
FIG. 7 is a view showing a content of a change content detail 704 of FIG. 5 if the change operation is "entry attribute change" or "DN change"

FIG. 7 shows the content of the change content detail 704 provided if the change operation is "change of an entry attribute" or "change of a DN".

As shown in FIG. 7, the change content detail 704 is arranged so that a combination of an attribute change operation type 721, a change attribute name 722, and 0 or more attribute values 723 are provided in each attribute included in the target entry indicated by the target entry DN 702. The change attribute name 722 stores the data for indicating the attribute name to be changed. The attribute change operation type 721 stores the data for indicating the type of the attribute change operation. Concretely, the change operation type 721 stores a character string of "add" if the change operation is "addition of an attribute value", a character string of "delete" if it is "deletion of an attribute value", and a character string of "replace" if it is "change of an attribute value". The attribute value 723 stores an attribute value to be added if the change operation is "addition of an attribute value", an attribute value to be deleted if it is "deletion of an attribute value", and an attribute value after replacement if it is "replacement of an attribute value".

Figure 8:
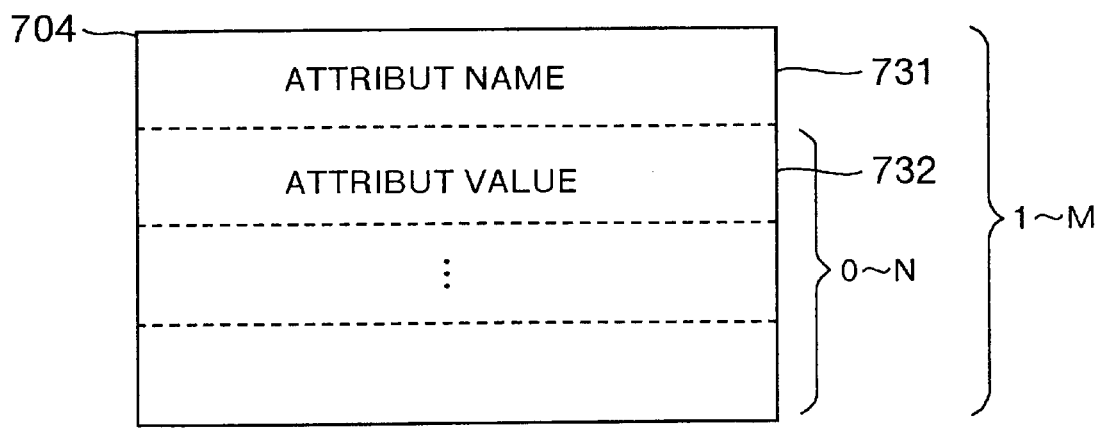
FIG. 8 is a view showing a content of a change content detail 704 of FIG. 5 if the change operation is "addition of an entry"

FIG. 8 shows the content of the change content detail 704 provided if the change operation is "addition of an entry".

As shown in FIG. 8, the change content detail 704 is arranged so that a combination of an attribute name 731 and 0 to N attribute values 732 is provided in each attribute included in an entry to be added. The attribute name 731 stores the data for indicating an attribute name included in the entry to be added. The attribute value 732 stores the data for indicating an attribute value of an attribute name specified by the attribute name 731.

Turning to FIG. 5, the description will be expanded as follows.

A new RDN 705 stores the data for indicating the RDN after changing the entry to be changed if the change operation type 702 stores a character string of "rename", that is, "change of a DN".

A new upper DN 706 stores the data for indicating a DN of a parent entry to be changed if the change operation type 701 stores a character string of "rename", that is, "change of a DN".

In the arrangement shown in FIG. 3, the change history to be created if the attribute of the entry 504 for representing an employee AA is changed is shown in FIG. 9. As shown, the change operation type 701 stores a character string of "modify" for indicating "change of an entry attribute value". The target entry DN 702 stores the DN "AA" of the entry 504. The target entry attribute 703 stores the attribute before changing the entry 504. The change content detail stores the attribute after changing the entry 504. In this case, since the change operation is "change of an entry attribute value", no new RDN 705 and new upper DN 706 are provided.

In turn, the description will be oriented to the filtering rule stored in the filtering rule table 32.

FIG. 10 shows the content of the filtering rule stored in the filtering rule table 32.

As shown, the filtering rule table 32 stores at least one filtering rule 800 in each of the application data contained in the application servers 2a and 2b.

The filtering rule 800 is composed of an application ID 801, a Basedn 802, a Scope 803, a Filter 804, and a conversion rule ID 805.

The application ID 801 means the identification information for specifying the application data on which the data of the entry searched by the filtering rule 800 is to be reflected.

The Basedn 802 and the Scope 803 operate to specify the location of the entry data to be reflected onto the application ID 801 in the directory data to be managed in a tree-structure manner. The Basedn 802 stores the data for indicating the DN of the entry of the base point in the target area, while the Scope 803 stores character string data for indicating the range from the entry of the base point specified by the Basedn 802.

FIG. 11 shows the possible values and their meanings to be taken by the Scope 803. The Scope 803 may take three values of "base", "onelevel" and "subtree". The "base" means only the base-point entry, the "onelevel" means only a child entry of the base point, and the "subtree" means all the entries following the base point.

A filter 804 indicates the conditions to be met by the attribute values of the target entry. It is made up of a conditional expression composed of an attribute name and a possible value to be taken by the attribute specified by the attribute name, or an OR, an AND or a NOT of plural conditional expressions.

A conversion rule ID 805 indicates an identifier of the conversion rule for indicating the schema conversion rule to be applied to the change history for meeting all of the Basedn 802, Scope 803, and Filter 804.

Figure 12:
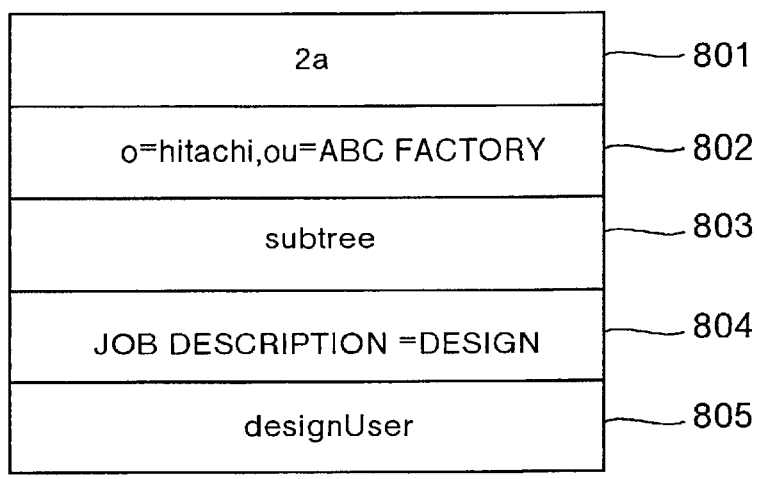

Turning to FIG. 3, with regard to the example shown therein, an example of a filtering rule for reflecting the change against the entry 504 representing the employee AA onto the application data of the application server 2a is shown in FIG. 12. As shown, the application ID 801 stores an ID "2a" of the application data stored in the server 2a. The Basedn 802 stores an DN "o=hitachi, ou=ABC factory" of the base-point entry of a tree representing the ABC factory, for restricting the range of the directory data 500 all over the company to be reflected onto the application data of the server 2a. The Scope 803 stores "subtree" for indicating all the entries following the base-point entry stored in the Basedn 802. The Filter 804 stores the conditional expression "job description=design" composed of an attribute name and an attribute value. It is intended for only the employee of the designer among all the entries contained in the directory data 503 of the ABC factory. The conversion rule ID 805 stores an ID "Design User" of the schema conversion rule to be applied.

In the foregoing example shown in FIG. 3, this filtering rule is executed to change the attributes of the entry 504 for representing the employee AA and the entry 505 for representing the employee BB. In the case of creating the change history, the change history filtering unit 33 is served to search only the change history for the entry 504 having the attribute "job description=design", but not the change history for the entry 505 having the attribute "job description=sales".

In turn, the description will be oriented to the schema conversion rule stored in the schema conversion rule table 34. The prepared filtering rules are determined by the schema of Directory Service, and the schema of the supported application, and the operating conditions of the application.

Figure 13:
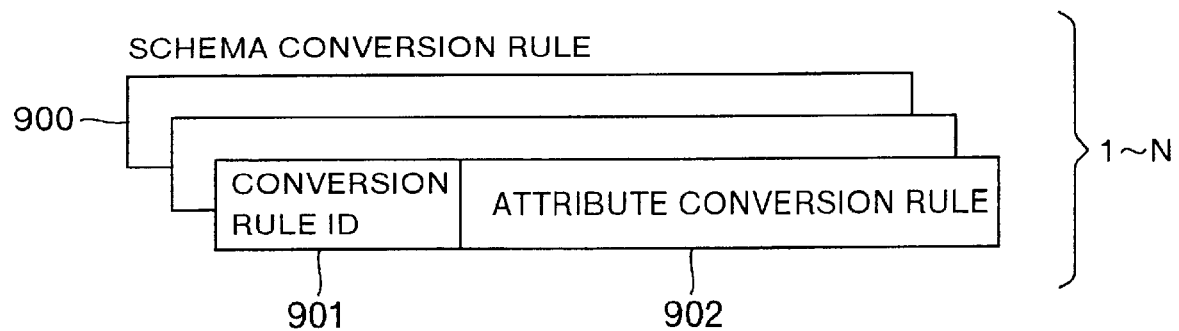
FIG. 13 is a view showing contents of schema conversions to be recorded in a schema conversion rule table 34.

FIG. 13 shows the content of the schema conversion rule stored in the schema conversion rule table 34.

As shown, the schema conversion rule table 34 stores at least one schema conversion rule 900.

The schema conversion rule 900 is a rule for converting the directory data based on the schema of the directory service done by the directory server into the application data based on the schema of the application service done by the application server 2a or 2b. As shown, the rule 900 is composed of the conversion rule ID 901 (that is the same as the conversion rule ID 05 shown in FIG. 10) for distinguishing the schema conversion rule and an attribute conversion rule 902 for generating from the attribute value of the directory entry a value of each attribute composing the schema of the application data to be reflected.

FIG. 14 is an explanatory view showing the attribute conversion rule 902.

As stated above, the attribute conversion rule 902 is a rule for generating the attribute value on the different schema with the attribute value based on any schema as an input. As shown in FIG. 14A, the rule 902 is composed of one or more combinations of an attribute name 912 and an attribute value generating rule 922. For example, in FIG. 14B, the data based on the schema-A is converted into the data based on the schema-B through the effect of the attribute conversion rule 902 shown in FIG. 14A.

Turning to FIG. 3, in the example shown therein, an example of a schema conversion rule for reflecting the change done for the entry 504 representing the employee A onto the application data of the application server 2a is shown in FIG. 15. As shown, the conversion rule ID 902 stores an ID "Design User" of the schema conversion rule (that is the same as the conversion rule ID 805 shown in FIG. 12) for reflecting the change done for the entry onto the application data of the application server 2a. The attribute conversion rule 902 stores the schema conversion rule for reflecting the data of the entry 504 onto the application data of the server 2a as shown in FIG. 14.

In turn, the description will be oriented to the detail of the operation of the directory data converting server 3 provided in the directory service system according to this embodiment.

Figure 16:
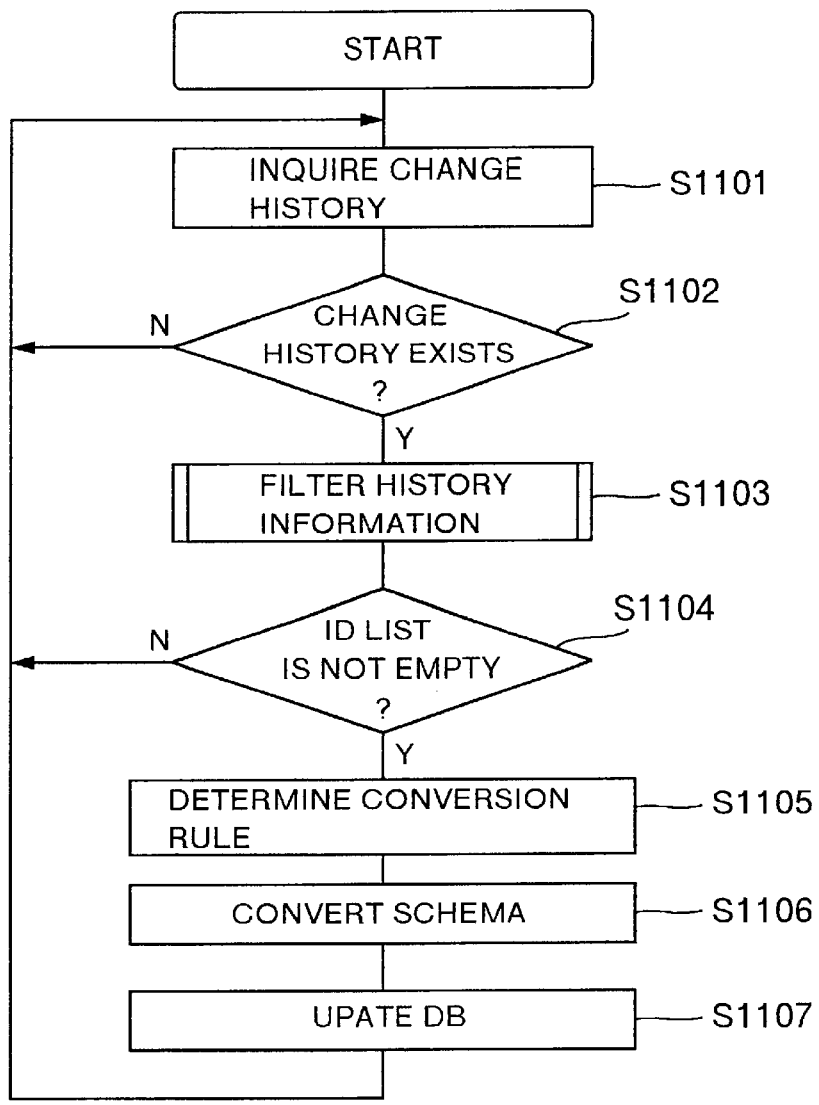
FIG. 16 is a flowchart showing an operation of a directory data converting server 3.

FIG. 16 is a flowchart for illustrating the operation of the directory data converting server 3.

At first, the change history acquisition unit 31 operates to make access to the directory server 1 for inquiring if the intact change history 700 that has not acquired yet is left (step S1101). If yes, the acquisition unit 31 operates to acquire from the directory server 1 the earliest change history 700 of the intact change histories 700 and then pass it to the change history filtering unit 33 (step S1102). On the other hand, if no, the operation goes back to the step S1101. A certain time later, the acquisition unit 31 operates to make access to the directory server 1 again, for inquiring if the intact change history 700 is left.

In receipt of the change history 700 from the change history acquisition unit 31, the change history filtering unit 33 operates to check if the change history 700 meets the condition regulated in the filtering rule 800 with regard to each of the filtering rules 800 stored in the filtering rule table 32. Then, the filtering unit 33 operates to detect the filtering rule 800 having the satisfactory change history 700. Then, the filtering unit 33 is served to create an ID list composed of a combination of the application ID 801 and the conversion rule ID 805 specified by the detected filtering rule 800 and then pass it to the conversion rule determining unit 35 together with the change history 700 (step S1103).

Figure 17:
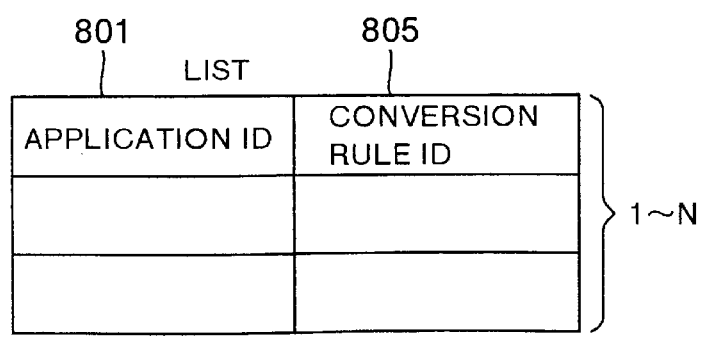
FIG. 17 is a table showing an example of an ID list created in a change history filtering unit 33.

FIG. 17 shows an example of an ID list created by the change history filtering unit 33. This ID list indicates the change history 700 received by the change history acquisition unit 31 meets the condition specified by one filtering rule 800 stored in the filtering rule table 32. In addition, if the change history 700 received by the change history acquisition unit 31 does not meet the condition specified by any filtering rule 800 stored in the filtering rule table 32, the ID list is empty.

Next, in receipt of the change history 700 and the ID list from the change history filtering 33, the conversion rule determining unit 35 operates to check the content of the ID list for checking if it is empty (step S1104). If it is empty, it indicates that the received change history 700 does not meet the condition specified by any filtering rule 800 stored in the filtering rule table 32. In this case, the operation is executed to abandon the received change history 700 and the ID list and then goes back to the step S1101. If, on the other hand, it is not empty, the conversion rule determining unit 35 operates to acquire from the schema conversion rule table 34 the schema conversion rule 900 specified by the conversion rule ID 805 described in the ID list, add it to the application ID 801 paired with the conversion rule ID 805, and then pass the pair to the schema converting unit 36 together with the change history 700 (step S1105).

Next, the schema converting unit 36 operates to schema-convert the data of the entry contained in the change history 700 received from the conversion rule determining unit 35 on the basis of the schema conversion rule 900 received from the conversion rule determining unit 35 like the above. If two or more schema conversion rules 900 are received, the data of the entry contained in the change history 700 is schema-converted according to each of the schema conversion rules 900. Then, the schema converting unit 36 operates to add to the converted result the application ID 805 added to the schema conversion rule 900 used for this conversion, and then pass it to the DB update unit 37 (step S1106).

Then, the DB update unit 37 operates to reflect the schema converted result received from the schema converting unit 36 onto the application data specified by the application ID 805 added to the result according to the type of the change operation indicated in the change history 700 and then update the application data (step S1107).

Concretely, if the type of the change operation is "addition of an entry", the DB update unit 37 operates to add the schema converted result for the data of the target entry to the application data. If it is "deletion of an entry", the DB update unit 37 operates to delete the schema converted result for the data of the target entry from the application data. If it is "change of an entry attribute value", the DB update unit 37 operates to delete the schema converted result for the data of the target entry before the change of the attribute value from the application data and then update the schema converted result for the data of the target entry after changing the attribute value. If it is "change of a DN", the DB update unit 37 operates to delete the data of the entry specified by the DN before the change from the application data and add the data of the entry specified by the DN after the change to the application data.

For example, in FIG. 2, if the application server program 57 is an LDAP directory sever program, the LDAP update request is generated from the update history 700 after schema conversion. If the application server program 57 is an SQL (Structured Query Language) server program, the SQL is generated from the update history 700 after schema conversion.

Next, the description will be oriented to the process (for filtering the history information) at the step S1103 shown in FIG. 16.

Figure 18:
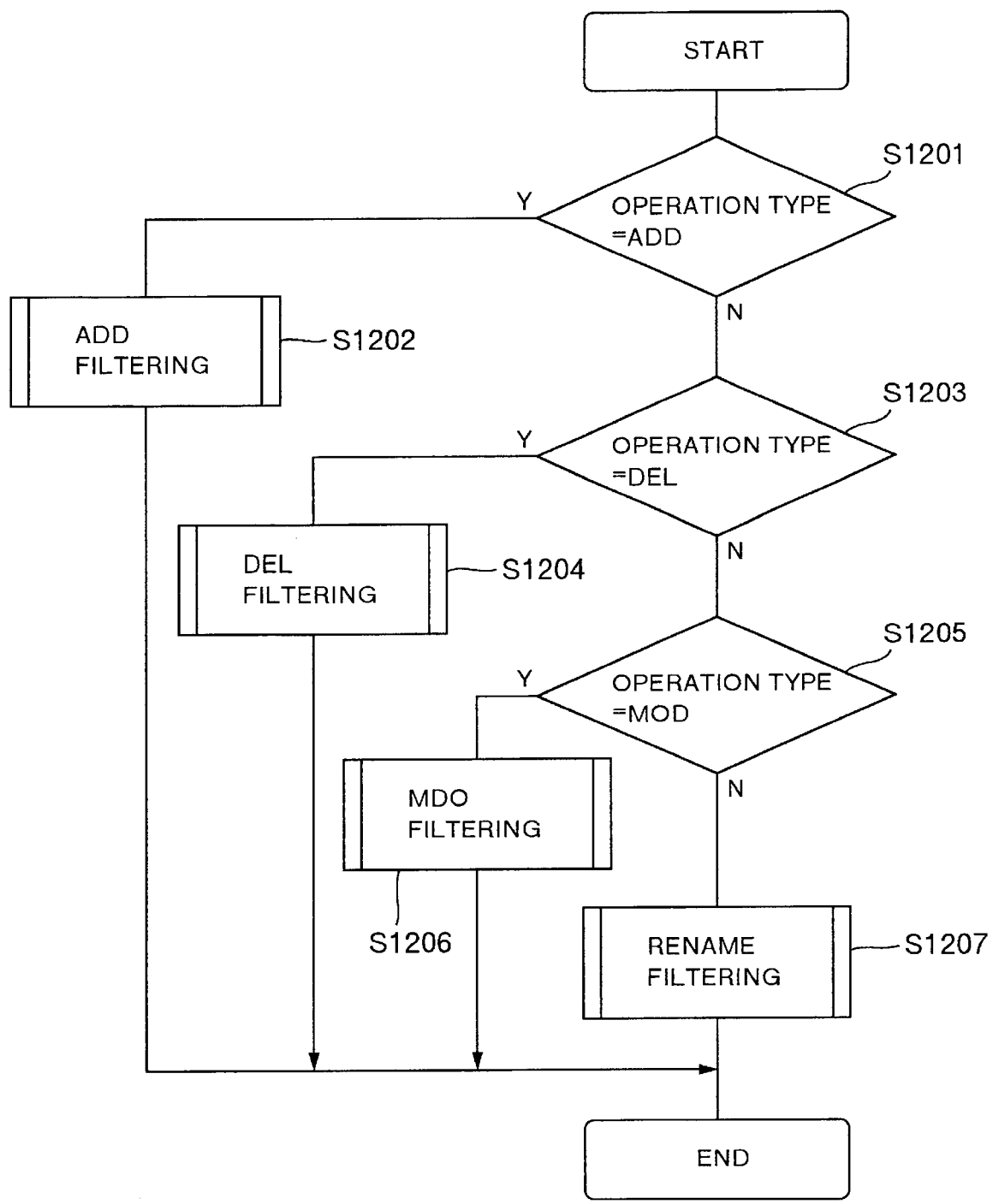
FIG. 18 is a flowchart showing a process (history information filtering process) at a step S1103 shown in FIG. 16.

FIG. 18 is a flowchart for illustrating the process (filtering the history information) at the step S1103 shown in FIG. 16.

The change history filtering unit 33 operates to, at first, check if the change operation type 701 of the change history 700 received from the change history acquisition unit 31 is "add" for indicating "addition of an entry" (step S1201). If it is "add", the below-mentioned ADD filtering is carried out with respect to the change history 700 (S1202).

If the change operation type 701 is not "add", it is checked if the change operation type 701 is "delete" for indicating "deletion of an entry" (step S1203). If it is "delete", the below-mentioned DEL filtering is carried out with respect to the change history 700 (step S1204).

If the change operation type 701 is not "delete", it is checked if the change operation type 701 is "modify" for indicating "change of an entry" (step S1205). If it is "modify", the below-mentioned MOD filtering is carried out for the change history 700 (step S1206).

If the change operation type 701 is not "modify", the change operation type 701 is assumed to be "rename" for indicating "change of a DN". Then, the below-mentioned RENAME filtering is carried out for the change history 700 (step S1207).

In turn, the description will be oriented to the process (for ADD filtering) at the step S1202 shown in FIG. 18.

Figure 19:
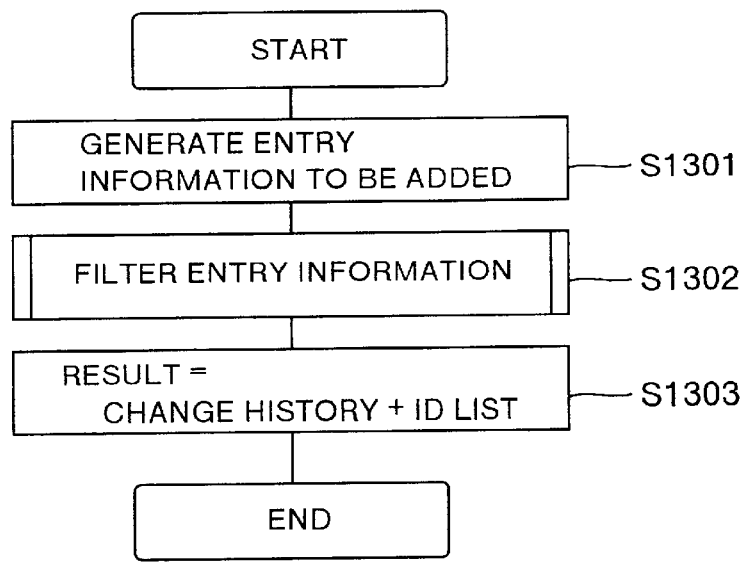
FIG. 19 is a flowchart showing a process (ADD filtering process) at a step S1202 shown in FIG. 18.

FIG. 19 is a flowchart for illustrating the process (for ADD filtering) at the step S1202 shown in FIG. 18.

Figure 20:
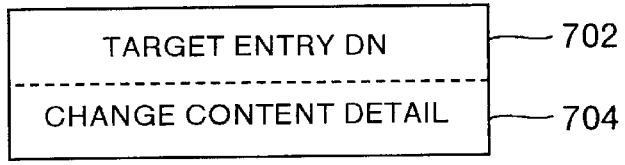
FIG. 20 is a view showing an addition entry information to be created in the flow shown in FIG. 19.

The change history filtering unit 33 operates to, at first, take the target entry DN 702 and the change content detail 704 out of the change history 700 and then create the information of an added entry (added entry information) as shown in FIG. 20 (step S1301).

Next, the filtering unit 33 operates to perform the below-mentioned entry information filtering operation with respect to the added entry information created before, for searching the filtering rule 800 having the satisfactory change history 700 (step S1302). Then, the filtering unit 33 operates to create the ID list composed of a combination of the application ID 801 and the conversion rule ID 805 described in the searched filtering rule 800. (If no filtering rule 800 is searched, the ID list is empty.) The ID list is passed to the conversion rule determining unit 35 together with the change history 700 (step S1303).

Next, the process (DEL filtering) at the step S1204 shown in FIG. 18 will be described in detail.

Figure 21:
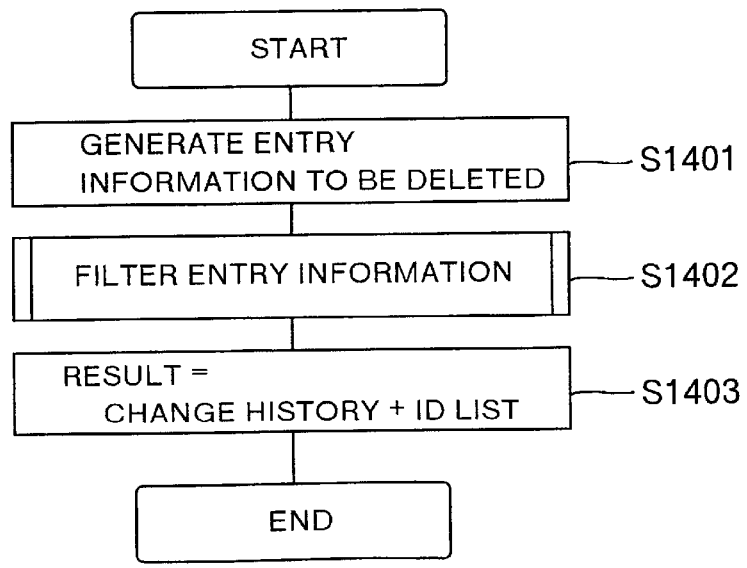
FIG. 21 is a flowchart showing a process (DEL filtering process) at a step S1204 shown in FIG. 18.

FIG. 21 is a flowchart for illustrating the process (for DEL filtering) at the step S1204 shown in FIG. 18.

Figure 22:
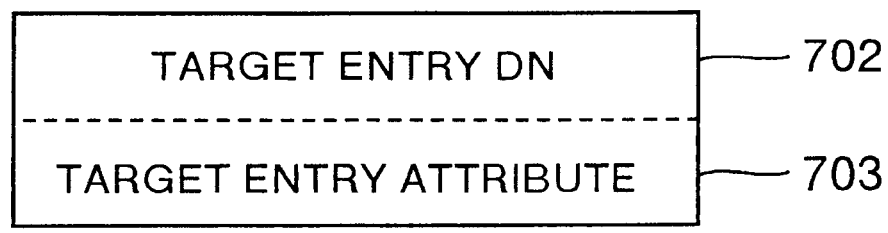
FIG. 22 is a view showing deletion entry information to be created in the flowchart shown in FIG. 21.

The change history filtering unit 33 operates to, at first, take the target entry DN 702 and the target entry attribute 703 from the change history 700 and then to create the information of the deleted entry (deleted entry information) as shown in FIG. 22 (step S1401).

Next, the filtering unit 33 operates to perform the below-mentioned entry information filtering operation with respect to the deleted entry information created before and then to search the filtering rule 800 having the satisfactory change history 700 (step S1402). Then, the filtering unit 33 operates to create an ID list composed of the application ID 801 and the conversion ID 805 described in the searched filtering rule 800. (If no filtering rule 800 is searched, the ID list is empty.) The ID list is passed to the conversion rule determining unit 35 together with the change history 700 (step S1403).

In turn, the process (for MOD filtering) at the step S1206 shown in FIG. 18 will be described in detail.

Figure 23:
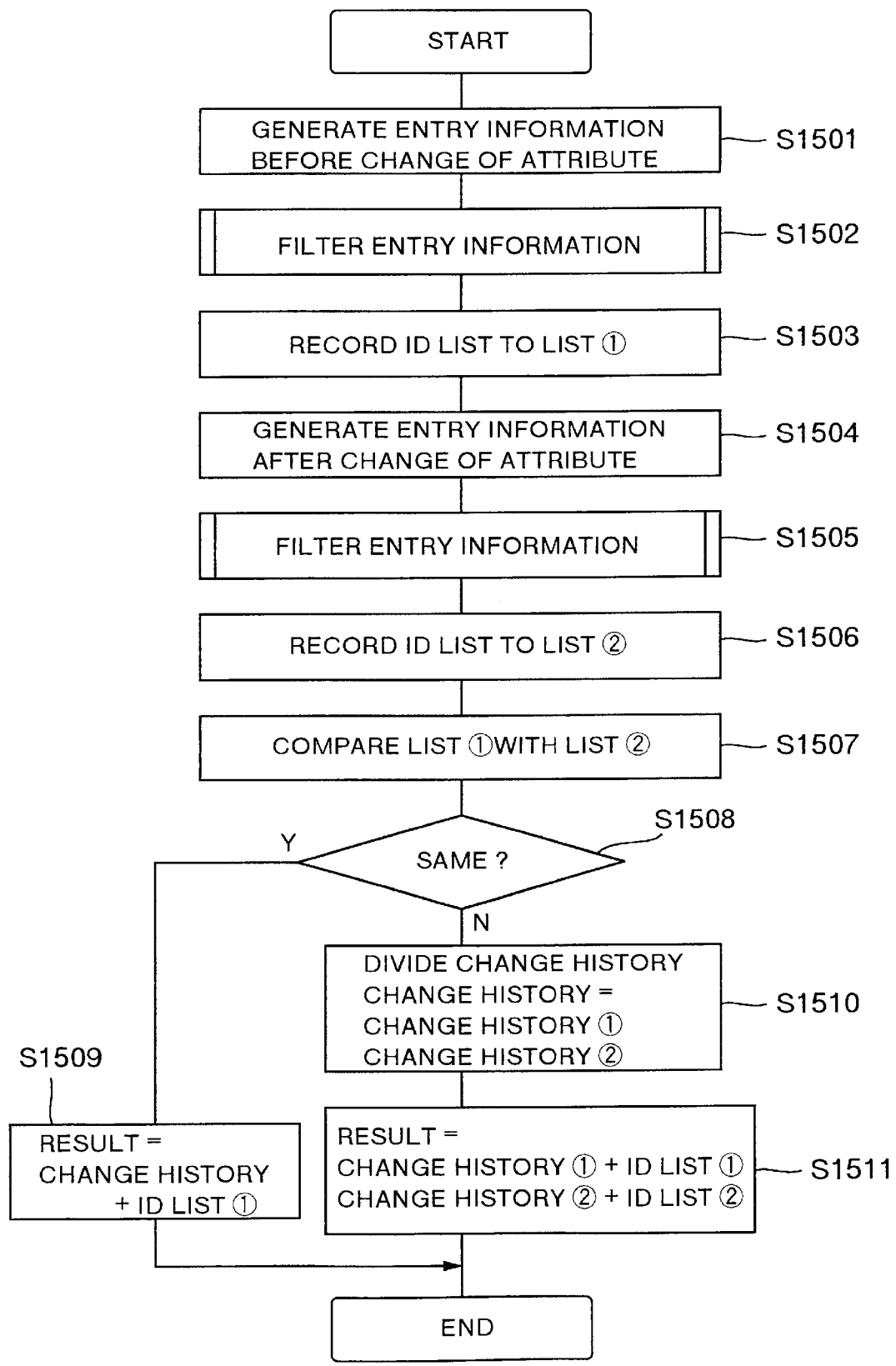
FIG. 23 is a flowchart showing a process (MOD filtering process) at a step 1206 shown in FIG. 18.

FIG. 23 is a flowchart for illustrating the process (for MOD filtering) at the step S1206 shown in FIG. 18.

The change history filtering unit 33 operates to, at first, take the target entry DN 702 and the target entry attribute 703 from the change history 700 and then create the information before changing the attribute of the changed entry (entry information before changing the attribute) (step S1501). Next, the filtering unit 33 operates to perform the below-mentioned entry information filtering operation with respect to the entry information before changing the attribute and then search the filtering rule 800 having the satisfactory change history 700 (step S1502). Then, the filtering unit 33 operates to create the ID list (ID list (1)) composed of the application ID 801 and the conversion rule ID 805 described in the searched filtering rule 800 (step S1503).

Then, the change history filtering unit 33 operates to take the target entry DN 702 and the change content detail 704 from the change history 700 and then create the information after changing the attribute of the changed entry (entry information after changing the attribute) (step S1504). Next, the filtering unit 33 operates to perform the below-mentioned filtering rule 800 with respect to the entry information after changing the attribute and then search the filtering rule 800 having the satisfactory change history 700 (step S1505). And, the filtering unit 33 operates to create the ID list (ID list (2)) composed of a combination of the application ID 801 and the conversion rule ID 805 described in the searched filtering rule 800 (step S1506).

Then, the filtering unit 33 operates to compare the created ID list (1) with the ID list (2) (steps S1507 and 1508). If both are the same, the ID list (1) is passed to the conversion rule determining unit 35 together with the change history 700 (step S1509).

If, on the other hand, neither is the same, it means that the schema conversion rule used for the data of the target entry before changing the attribute is different from the schema conversion rule used for the data of the target entry after changing the attribute. In addition, the change of the schema conversion rule may take place in the case of changing the attribute value used in the determining condition described in the Filter 804 of the filtering rule 800.

In this case, the filtering unit 33 operates to create from the change history 700 for the "change of an attribute value" operation the change history for the "deletion of an entry" operation meaning deletion of a target entry before changing the attribute value (referred to as a change history (1)) and the change history for the "addition of an entry" operation meaning addition of a target entry after changing the attribute value (referred to as a change history (2)) (steps S1510). Then, the ID list (1) is added to the change history (1) and the ID list (2) is added to the change history (2), and the results are passed to the conversion rule determining unit 35 (step S1511).

Herein, the description will be oriented to the process of creating the change history (1) for the "deletion of an entry" operation and the change history (2) for the "addition of an entry" operation from the change history 700 for the "change of an attribute value" operation (which is referred to as a process of dividing the change history). FIG. 26 is an explanatory view showing the process for dividing the change history at the step S1510 shown in FIG. 23.

As shown, the change history (1) is created by changing the change operation type 701 of the change history 700 from "modify" to "delete". The change history (2) is created by changing the change operation type 701 of the change history 700 from "modify" into "add" and the change content detail 704 from the format (for change of an attribute value) shown in FIG. 7 into the format (for addition of an entry) shown in FIG. 8. In this case, the attribute name after changing the attribute is described in the attribute name 703 of the change content detail 704 shown in FIG. 8 and the attribute value after changing the attribute is described in the attribute value 712.

In turn, the process (for RENAME filtering) at the step S1207 shown in FIG. 18 will be described in detail.

Figure 27:
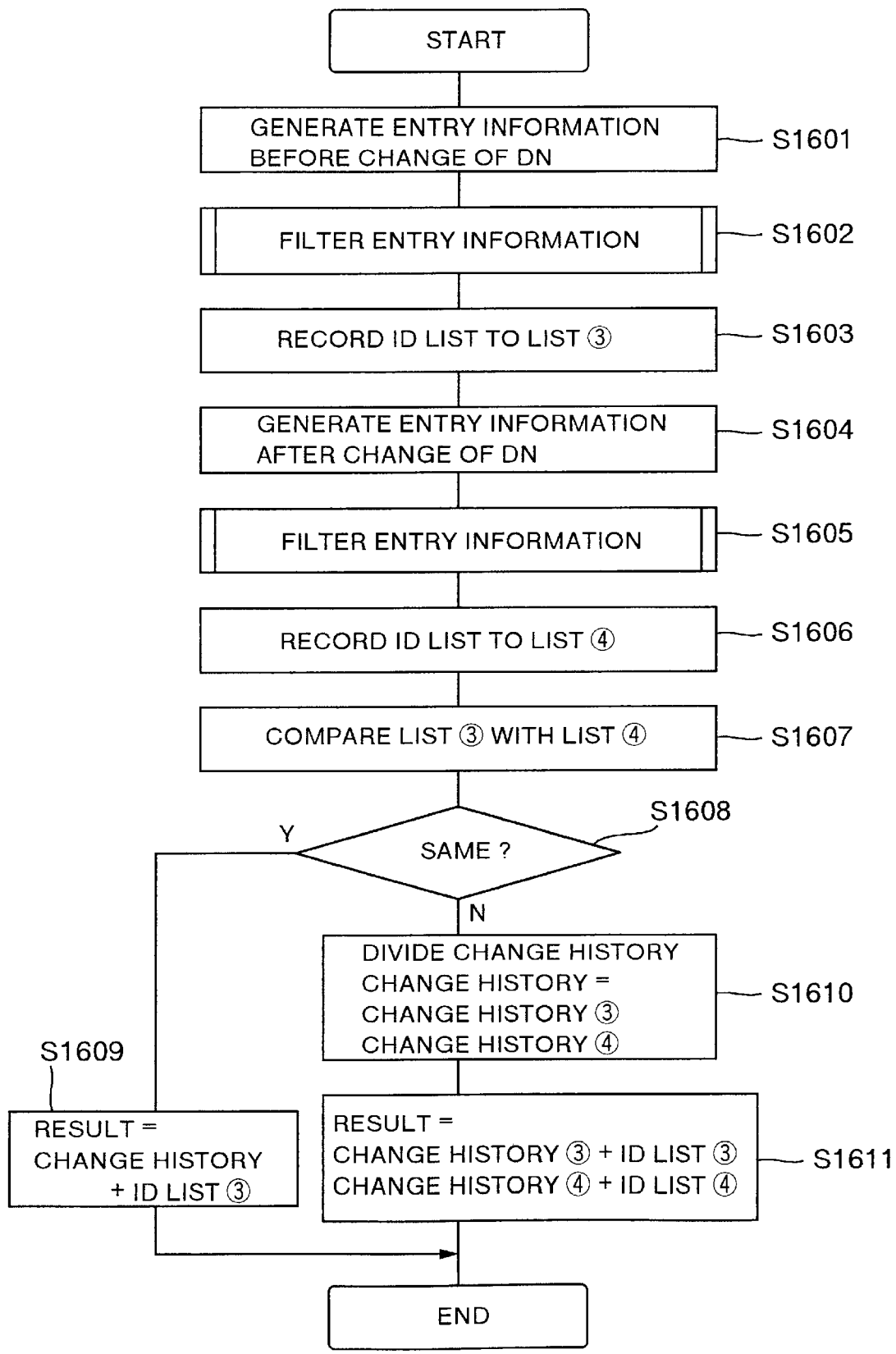
FIG. 27 is a flowchart showing a process (RENAME filtering process) at a step S1207 shown in FIG. 18.

FIG. 27 is a flowchart for illustrating the process (RENAME filtering) at the step S1207 shown in FIG. 18.

The change history filtering unit 33 operates to, at first, take the target entry DN 702 and the target entry attribute 703 from the change history 700 and then create the information before changing the DN of the target entry (entry information before changing the DN) (step S1601). Next, the filtering unit 33 performs the below-mentioned entry information filtering operation with respect to the entry information before changing the DN created above and searches the filtering rule 800 having the satisfactory change history 700 (step S1602). Then, a new ID list is created (step S1603). The ID list (referred to as an ID list (3)) is composed of a combination of the application ID 801 and the conversion rule ID 805 described in the searched filtering rule 800.

Then, the change history filtering unit 33 operates to take the new RDN 705, the new upper DN 706, and the change content detail 704 from the change history 700 and then create the information after changing the DN of the target entry (entry information after changing the DN) as shown in FIG. 29. Next, the filtering unit 33 operates to perform the below-mentioned entry information filtering operation with respect to the entry information after changing the DN created above and then search the filtering rule 800 having the satisfactory change history 700 (step S1605). Then, a new ID list (referred to as an ID list (4)) is created (step S1606). The ID list (4) is composed of a combination of an application ID 801 and a conversion rule ID 805 described in the searched filtering rule 800.

Next, the change history filtering unit 33 operates to compare the ID list (3) with the ID list (4) (steps S1607 and 1608). If both are the same, the ID list (3) is passed to the conversion rule determining unit 35 together with the change history 700 (step S1609).

If neither is the same, it means that the schema conversion rule used for the data of the target entry before changing the DN is different from the schema conversion rule used for the data of the target entry after changing the DN.

In this case, the operation is executed to create the change history for the "deletion of an entry" operation (referred to as the change history (3)) meaning deletion of a target entry before changing the DN and the change history for the "addition of an entry" operation (referred to as the change history (4)) meaning addition of a target entry after changing the DN from the change history 700 for the "DN change" operation (step S1610). Then, the ID list (3) is added to the change history (3) and the ID list (4) is added to the change history (4). These results are passed to the conversion rule determining unit 35 (step S1611).

Herein, the description will be oriented to the process (referred to as a process of dividing the change history) of creating the change history (3) for the "deletion of an entry" operation and the change history (4) for the "addition of an entry" operation from the change history 700 for the "DN change" operation. FIG. 30 is an explanatory view showing the process of dividing the change history at the step S1610 shown in FIG. 27.

As shown, the change history (3) is created by changing the change operation type 701 of the change history 700 from "rename" to "delete". The change history (4) is created by changing the change operation type 701 of the change history 700 from "rename" into "add", changing the target entry DN 702 into the new DN specified by the new RDN 705 and the upper DN 706, deleting the new RDN 705 and the upper DN 706 from the change history 700, and changing the change content detail 704 from the format (for the DN change) shown in FIG. 7 into the format (for the entry addition) shown in FIG. 8. In this case, the attribute name of the entry after changing the DN is described in the attribute name 703 of the change content detail 704 shown in FIG. 8 and the attribute value of the entry after changing the DN is described in the attribute value 712.

In turn, the description will be oriented to the detail of the process of filtering the entry information in each flow shown in FIGS. 19, 21, 23 and 27.

Figure 31:
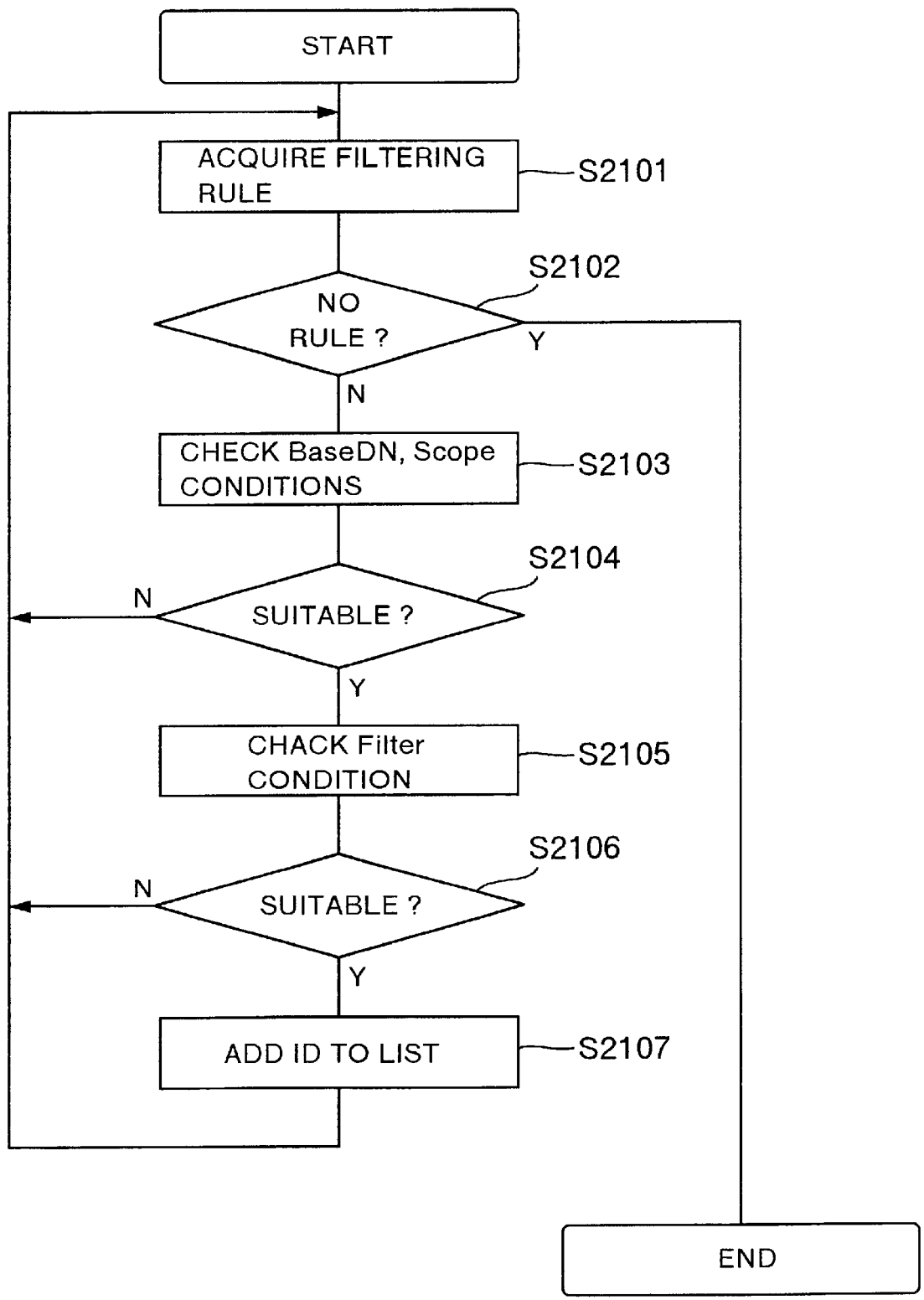
FIG. 31 is a flowchart showing a process of filtering entry information in each flowchart of FIG. 19, FIG. 21, FIG. 23, and FIG. 27.

FIG. 31 is a flowchart for illustrating the process of filtering entry information in each flow shown in FIGS. 19, 21, 23 and 27.

The change history filtering unit 33 operates to, at first, acquire one filtering rule 800 that is not still non-acquired from the filtering rule table 32 (step S2101). If all the filtering rules 800 have been already acquired from the filtering rule table 32, the process is terminated (step S2102).

Next, if the filtering rule 800 is acquired, the change history filtering unit 33 operates to check if the DN described in the target entry DN 702 of the change history exists in the range of the entry defined by the Basedn 802 and the Scope 803 of the acquired filtering rule 800 (step S2103). If no DN exists, going back to the step S2101, one non-acquired filtering rule 800 is acquired from the filtering rule table 32.

If, on the other hand, any DN exists, it is checked if the data of the attribute described in the change history meets the condition defined by the Filter 804 of the filtering rule 800 (step S2105). The data of the attribute described in the change history corresponds to the data of the attribute described in the change content detail 704 if the change operation type 701 is the "addition of an entry" operation or the data of the attribute described in the target entry attribute 703 if it is the "deletion of an entry" operation. Further, if the change operation type 701 of the change history is "change of an attribute value" or "change of a DN", as mentioned above, the process of dividing the change history is executed to divide the change history into those for the "addition of an entry" and the "deletion of an entry". Hence, the target change history about which the process of filtering the entry information is executed is restricted to any one of "addition of an entry" and "deletion of an entry".

At the step S2105, if the data of the attribute described in the change history meets the condition defined by the Filter 804 of the filtering rule 800, a pair of the application ID 801 and the conversion rule ID 805 described in this filtering rule 800 is added to the ID list. Then, the operation goes back to the step S2101. If, on the other hand, it does not meet the condition, the operation immediately goes back to the step S2101.

The foregoing description has been concerned with one embodiment of the present invention.

In this embodiment, about the directory data, by specifying the entry to be reflected onto any application data by the filtering rule, it is possible to selectively reflect any entry onto any application. Further, by allocating any schema conversion rule to a specified entry or a set of entries, the schema conversion can be executed according to the different rule in each entry or each set of entries. According to this embodiment, therefore, if the directory data is different in the target object and the schema from the application data, the synchronization is made possible between the directory data and the application data.

By specifying a certain entry according to plural filtering rules and allocating plural schema conversion rules to the entry, the process is made possible of applying a standard schema conversion rule for an overall company to an overall directory tree storing the information for an overall company, adding a standard schema conversion rule for an overall company to a subtree storing information of each department, and thereby applying the schema conversion rule of the department itself.

The present invention is not limited to the foregoing embodiment and may be transformed in various forms without departing from the spirit of the invention.

For example, the hardware of this embodiment shown in FIG. 2 is arranged so that the directory server 1, the application server 2, and the directory data converting server 3 are realized in their own information processing apparatus. However, the invention is not limited to this hardware arrangement. In place, the directory data conversion program 68, the filtering rule file 66, and the schema conversion rule file 67 are stored in the magnetic disk 43 of the information processing apparatus 4 served as the directory server 1 and the CPU 42 is served to execute the directory data conversion program 68. This arrangement makes it possible for the information processing apparatus 4 to be served as both the directory server 1 and the directory data conversion server 3. Or, the directory data conversion program 68, the filtering rule file 66, and the schema conversion rule file 67 are stored in the magnetic disk 53 provided in the information processing apparatus 5 served as the application server 2 and the CPU 52 is served to execute the directory data conversion program 68. This arrangement makes it possible for the information processing apparatus 5 to be served as both the application server 2 and the directory data conversion server 3. Or, one information processing apparatus may be served as the combination of the directory server 1, the application server 2, and the directory data conversion server 3.

In the foregoing embodiment, the change history acquisition unit 31 is arranged to acquire the change histories one by one in the earlier order. In place, the combination of plural change histories may be acquired for making the program execution efficient.

Moreover, the foregoing embodiment has been described with an example of reflecting the change added to the directory data onto the application data (updating the difference based on the change history). In actual, the present invention may be used in converting the directory data itself into the application data.

What is claimed is:

1. A method for converting directory data, for reflecting a content of said directory data onto application data, comprising the steps of:

changing said directory data in response to a request from a client of a directory;

storing a directory entry for a content of a change operation of said changing step to be done on said directory data;

searching data of said directory entry specified by a filtering rule corresponding to said application data;

schema-converting said searched data of said directory entry on the basis of a schema conversion rule compatible with said filtering rule for converting the data based on the schema of said directory data into the data based on the schema of said application data; and reflecting said schema-converted searched data of said directory entry onto said application data.

2. A method for converting directory data as claimed in claim 1, wherein the operation at said reflecting step is executed to reflect said schema-converted searched data of said directory entry onto application data according to the type of the change operation for change history.

3. A method for converting directory data as claimed in claim 2, wherein said searching step includes a detecting step for detecting a filtering rule for specifying data of a target directory entry for a change operation indicated in said change history from a filtering rule table for storing plural filtering rules, and a step of relating ID information of said schema conversion rule compatible with said detected filtering rule to said change history; and said schema-converting step includes a step of taking the schema conversion rule specified by ID information of said schema conversion rule corresponding to said change history from a schema conversion rule table for storing plural schema conversion rules and a step of schema-converting data of a target directory entry to be changed indicated in said change history according to said taken schema conversion rule.

4. A method for converting directory data as claimed in claim 3, wherein if the content of the change operation indicated in said change history is addition of a directory entry, the data of the target directory entry to be changed is data of the directory entry to be added, and if the content of the change operation indicated in said change history is deletion of the directory entry, the data of the target directory entry to be changed is the deleted data of said directory entry.

5. A method for converting directory data as claimed in claim 3, further comprising the step of, if the content of the change operation indicated in said change history is change of an entry name of said directory entry, creating a first change history for indicating the content of the change operation is deletion of said directory entry before changing an entry name and a second change history for indicating the content of the change operation is addition of said directory entry after changing an entry name from said change history, and said searching step includes a step of detecting a first filtering rule for specifying data of said target directory entry to be deleted indicated in said first change history and a second filtering rule for specifying data of said target directory entry to be added indicated in said second change history and a step of relating the ID information of the schema conversion rule compatible with said detected first filtering rule to said first change history and the ID information of the schema conversion rule compatible with said detected first filtering rule to said first change history and the ID information of the schema conversion rule compatible with said second filtering rule to said second change history, and said schema-converting step includes a step of taking from said schema conversion rule table a first schema conversion rule specified by the ID information of the relating schema conversion rule to said first change history and a second schema conversion rule specified by the ID information of the relating schema conversion rule to said second change history and a step of schema-converting data of a target directory entry to be deleted indicated in said first change history according to said taken first schema conversion rule and schema-converting data of a target directory entry to be added indicated in said second change history according to said taken second schema conversion rule.

6. A method for converting directory data as claimed in claim 3, further comprising a history-changing step of, if the content of the change operation indicated in said change history is change of data of the directory entry, creating from said change history a first change history for indicating the content of the change operation is deletion of the directory entry before changing the data and a second change history for indicating the content of the change operation is addition of the directory entry after changing the data, and said searching step includes a step of detecting from said filtering rule table a first filtering rule for specifying the data of the target directory entry to be deleted indicated in said first change history and a second filtering rule for specifying the data of the target directory entry to be added indicated in said second change history and a step of relating ID information of the schema conversion rule compatible with said detected first filtering rule to said first change history and ID information of the schema conversion rule compatible with said detected second filtering rule to said second change history, and said schema-converting step includes a step of taking from said schema conversion rule table a first schema conversion rule specified by the ID information of the schema conversion rule corresponding to said first change history and a second schema conversion rule specified by the ID information of the schema conversion rule corresponding to said second change history and a step of schema-converting the data of the target directory entry to be deleted indicated in said first change history according to said taken first schema conversion rule and the data of the target directory entry to be added indicated in said second change history according to said taken second schema conversion rule.

7. A method for converting directory data as claimed in claim 1, wherein said directory entry includes history records of operations so as to be reflected by said application data.

8. A system for converting directory data, for reflecting a content of directory data onto application data, comprising:

a searching unit for searching data of a directory entry specified by a filtering rule corresponding to application data;

a schema-converting unit for schema-converting said searched directory entry data on the basis of a schema conversion rule compatible with said filtering rule for converting data based on the schema of said directory data into data based on the schema of said application data; and a reflecting unit for reflecting said schema-converted searched directory entry data onto said application data.

9. A system for converting directory data as claimed in claim 8, wherein said searching unit operates to search data of the directory entry specified by said filtering rule from said change history; and said reflecting unit operates to reflect said schema-converted directory entry data onto said application data according to a type of a change operation indicated in said change history.

10. A method for converting directory data as claimed in claim 9, wherein said searching unit includes the step of detecting from a filtering rule table for storing plural filtering rules a filtering rule for specifying data of a target directory entry to be changed indicated in said change history and a step of relating to said change history the ID information of the schema conversion rule compatible with said detected filtering rule, and said schema-converting unit includes the step of taking from a schema conversion rule table for storing plural schema conversion rules the schema conversion rule specified by the ID information of the schema conversion rule corresponding to said change history and a step of schema-converting data of the target directory entry to be changed indicated in said change history according to said taken schema conversion rule.

11. A system for converting directory data as claimed in claim 10, wherein if the content of the change operation indicated in said change history is addition of the directory entry, the data of the target directory entry to be changed is the data of the directory entry to be added, and if the content of the change operation indicated in said change history is deletion of the directory entry, the data of the target directory entry to be changed is the deleted data of the directory entry.

12. A method for converting directory data, for reflecting a content of directory data onto application data, comprising the steps of:

searching data of a directory entry specified by a filtering rule corresponding to said application data;

schema-converting said searched directory entry data according to a schema conversion rule for converting the data based on the schema of the directory data into the data based on the schema of said application data, said schema conversion rule compatible with the filtering rule used for searching said data; and reflecting said schema-converted searched data of said directory entry onto said application data.

13. A method for converting directory data as claimed in claim 12, wherein the operation at said searching step is executed to search the data of the directory entry specified by said filtering rule, the operation at said schema-converting step is executed to schema-convert said searched directory entry data according to the schema conversion rule corresponding to the filtering rule used for searching said data, and the operation at said reflecting step is executed to reflect said schema-converted searched data of said directory entry onto said application data according to the type of the change operation indicated in said change history.

14. A method for converting directory data as claimed in claim 13, wherein said searching step includes a step of detecting a filtering rule for specifying data of the target directory entry to be changed indicated in said change history from a filtering rule table for storing plural filtering rules and a step of relating to said change history the ID information of a schema conversion rule compatible with said detected filtering rule, and said schema-converting step includes a step of taking a schema conversion rule specified by the ID information of the schema conversion rule corresponding to said change history from a schema conversion rule table for storing plural schema conversion rules and a step of schema-converting the data of the target directory entry to be changed indicated in said change history according to said taken schema conversion rule.

15. A method for converting directory data as claimed in claim 14, wherein if the content of the change operation indicated in said change history is addition of a directory entry, the data of the target directory entry to be changed is the data of the added directory entry, and if the content of the change operation indicated in said change history is deletion of a directory entry, the data of the target directory entry to be changed is the data of the deleted directory entry.

16. A server for converting directory data, for reflecting a content of said directory data onto at least one piece of application data, comprising:

means for storing at least one of filtering rules for searching data of a given directory entry from said directory data, said filtering rules corresponding to said application data on which the content of said directory data is to be reflected;

means for storing a schema conversion rule for converting data based on the schema of said directory data into data based on the schema of said application data, said schema conversion rule compatible with said filtering rule stored in said filtering rule storing means;

filtering means for searching data of said directory entry from said directory data according to said filtering rule stored in said filtering rule storing means;

means for schema-converting said searched directory entry data according to the schema conversion rule compatible with said filtering rule used for searching said directory entry data, said schema conversion rule being stored in said schema conversion storing means; and means for updating said application data, for reflecting said schema-converted directory entry data onto the content of said directory data.

17. A program having codes to be read in a server system for converting directory data, for reflecting a content of the directory data onto application data, said codes comprising code sections for program steps of:

searching data of the directory entry specified by a filtering rule corresponding to the application data;

schema-converting said searched directory entry data according to a schema conversion rule compatible with said filtering rule for converting the data based on the schema of the directory data into the data based on the schema of said application data; and reflecting said schema-converted searched data of said directory entry onto said application data.

18. A program having codes to be read in a server system for converting directory data as claimed in claim 17, wherein the operation at said searching step is executed to search the data of the directory entry specified by said filtering rule from said change history, and the operation at said reflecting step is executed to reflect said schema-converted searched data of said directory entry onto said application data according to a type of a change operation indicated in said change history.

19. A program having codes to be read in a server system for converting directory data as claimed in claim 18, wherein said searching step includes a step of detecting the filtering rule for specifying the data of the target directory entry to be changed indicated in said change history from a filtering rule table for storing plural filtering rules and a step of relating to said change history the ID information of the schema conversion rule compatible with said detected filtering rule, and said schema-converting step includes a step of taking the schema conversion rule specified by the ID information of the schema conversion rule corresponding to said change history from a schema conversion rule table for storing plural schema conversion rules and a step of schema-converting the data of the target directory entry to be changed indicated in said change history according to said taken schema conversion rule.

20. A program having codes to be read in a server system for converting directory data as claimed in claim 19, wherein if the content of the change operation indicated in said change history is addition of the directory entry, the data of the target directory entry to be changed is the data of the added directory entry, and if the content of the change operation indicated in said change history is deletion of the directory entry, the data of the target directory entry to be changed is the data of the deleted directory entry.

* * * * *